United States Patent
Wang et al.

(10) Patent No.: US 10,570,736 B2
(45) Date of Patent: Feb. 25, 2020

(54) ROBOT AUTOMATED MINING

(71) Applicant: ABB Schweiz AG, Baden (CH)

(72) Inventors: Jianjun Wang, West Hartford, CT (US); Carlos Martinez, South Windsor, CT (US); Carlos Morato, Avon, CT (US); Biao Zhang, West Hartford, CT (US); Thomas Fuhlbrigge, Ellington, CT (US); Will Eakins, Bloomfield, CT (US); Sang Choi, Simsbury, CT (US); Daniel Lasko, Bloomfield, CT (US); Jan Nyqvist, Vasteras (SE); Remus Boca, Simsbury, CT (US)

(73) Assignee: ABB Schweiz AG, Baden (CH)

( * ) Notice: Subject to any disclaimer, the term of this patent is extended or adjusted under 35 U.S.C. 154(b) by 174 days.

(21) Appl. No.: 15/178,024

(22) Filed: Jun. 9, 2016

(65) Prior Publication Data
US 2017/0356292 A1     Dec. 14, 2017

(51) Int. Cl.
*E21C 37/12*     (2006.01)
*B25J 9/16*     (2006.01)
*E21C 37/00*     (2006.01)
*F42D 1/22*     (2006.01)
*E21D 9/00*     (2006.01)
*E21B 7/02*     (2006.01)

(52) U.S. Cl.
CPC ............ *E21C 37/12* (2013.01); *B25J 9/1689* (2013.01); *B25J 9/1697* (2013.01); *E21B 7/025* (2013.01); *E21C 37/00* (2013.01); *E21D 9/006* (2013.01); *F42D 1/22* (2013.01); *E21B 7/027* (2013.01); *G05B 2219/39212* (2013.01); *G05B 2219/45004* (2013.01)

(58) Field of Classification Search
CPC combination set(s) only.
See application file for complete search history.

(56) References Cited

U.S. PATENT DOCUMENTS

| | | | |
|---|---|---|---|
| 3,721,471 | A | 3/1973 | Bergmann et al. |
| 4,508,035 | A | 4/1985 | Mashimo |
| 5,584,222 | A | 12/1996 | Engsbraten et al. |
| 6,460,462 | B1 | 10/2002 | Rosenstock |

(Continued)

FOREIGN PATENT DOCUMENTS

| | | |
|---|---|---|
| WO | 2015107068 A1 | 7/2015 |
| WO | 2015127545 A1 | 9/2015 |

OTHER PUBLICATIONS

Automation of Blast Hole Charging Oct. 8, 2010 (accessed at https://confluence.csiro.au/pages/viewpage.action?pageId=274466304 (Year: 2010).*

(Continued)

*Primary Examiner* — Adam R Mott
(74) *Attorney, Agent, or Firm* — J. Bruce Schelkopf; Taft Stettinius & Hollister LLP

(57) ABSTRACT

In one embodiment, the present disclosure provides a robot automated mining method. In one embodiment, a method includes a robot positioning a charging component for entry into a drill hole. In one embodiment, a method includes a robot moving a charging component within a drill hole. In one embodiment, a method includes a robot filling a drill hole with explosive material. In one embodiment, a method includes operating a robot within a mining environment.

19 Claims, 19 Drawing Sheets

(56) References Cited

U.S. PATENT DOCUMENTS

| | | |
|---|---|---|
| 6,608,913 B1 | 8/2003 | Hinton et al. |
| 8,342,261 B2 | 1/2013 | Ahola et al. |
| 8,820,242 B2 | 9/2014 | Alexander |
| 2002/0128810 A1 | 9/2002 | Craig |
| 2005/0161257 A1 | 7/2005 | Finden |
| 2010/0116165 A1 | 5/2010 | Moore |
| 2012/0323495 A1 | 12/2012 | Zhou et al. |
| 2015/0003186 A1 | 1/2015 | Xue |
| 2015/0185715 A1 | 7/2015 | McHugh |
| 2016/0064195 A1* | 3/2016 | Lin ................... A43D 11/00 156/64 |

OTHER PUBLICATIONS

Robotic Explosive Charging in Mining and Construction Applications, IEEE Transactions on Automation Science and Engineering, vol. 11, No. 1, Jan. 2014, 6 pages.

International Search Report and Written Opinion, International Patent Application No. PCT/US2017/036588, dated Oct. 5, 2017, 20 pages.

\* cited by examiner

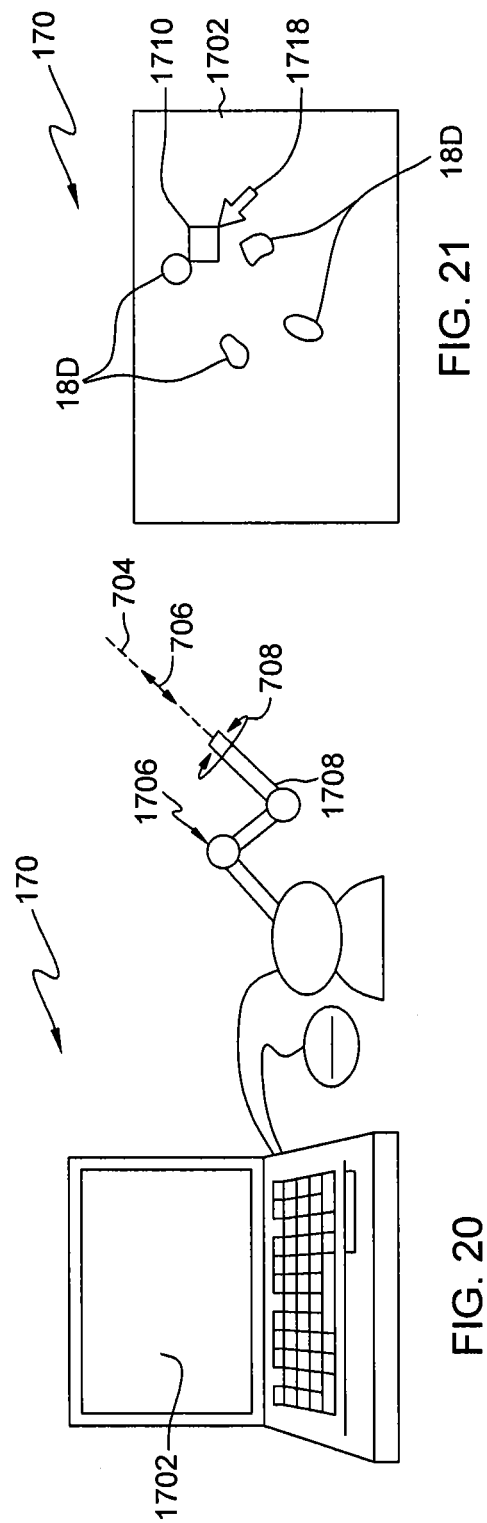

ROBOT AUTOMATED MINING

FIELD OF THE DISCLOSURE

This disclosure relates to mining environments and particularly to operation of a robot in a mining environment.

BACKGROUND

A mining environment can include generally a mining wall having a plurality of drill holes. In one embodiment, a mining wall can include a rock formation. The plurality of drill holes can extend a depth into the mining wall. A mining wall may not be flat in a plane parallel to an x-y reference plane but instead may include a plurality of protrusions or cavities extending in a z direction parallel to a z axis. For removing material of the mining wall, explosive material can be placed into the plurality of drill holes. The explosive material can be detonated for breaking apart a portion of the mining wall.

SUMMARY

In one embodiment, the present disclosure provides a robot automated mining method. In one embodiment, a method includes a robot positioning a charging component for entry into a drill hole. In one embodiment, a method includes a robot moving a charging component within a drill hole. In one embodiment, a method includes a robot filling a drill hole with explosive material. In one embodiment, a method includes operating a robot within a mining environment.

BRIEF DESCRIPTION OF THE DRAWINGS

Various aspects of the present disclosure are particularly pointed out and distinctly claimed as examples in the claims at the conclusion of the specification. The foregoing and other objects, features, and advantages of the disclosure are apparent from the following detailed description taken in conjunction with the accompanying drawings in which:

FIG. 20 is a physical form view illustrating a robot user interface in one embodiment;

FIG. 21 is a schematic diagram illustrating a robot user interface in one embodiment;

FIG. 22 is a schematic diagram illustrating a robot user interface in one embodiment;

DETAILED DESCRIPTION

The present disclosure addresses and enhances, inter alia, robot systems and a method of performing mining operations. A method herein can incorporate a robot system having a robot.

Figure 1:
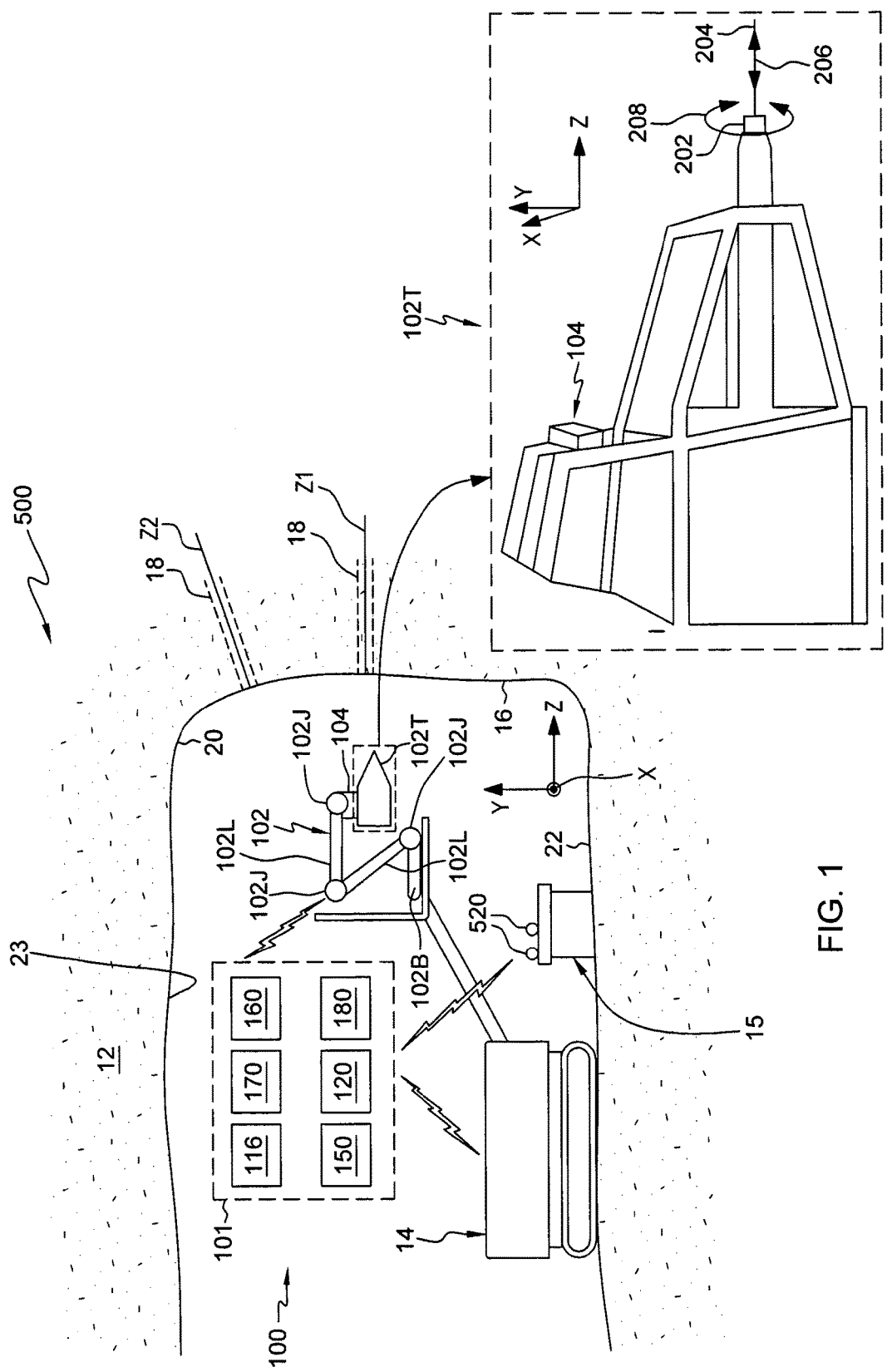
FIG. 1 is a schematic diagram illustrating a mining environment in which a robot can operate in one embodiment according to the present disclosure.

A mining environment 500 is illustrated generally at FIG. 1. Mining environment 500 can have a mining wall 16 characterized by a plurality of drill holes 18 (only two of which are shown in FIG. 1). Mining environment 500 can further include one or more system 100 having a robot 102. In one embodiment, robot 102 can include a base 102B, links 102L, joints 102J, and a tool assembly 102T. Robot 102 may be supported on a carrier 14. Tool assembly 102T can be connected to an end of a robot arm defined by links 102L and joints 102J. In one embodiment, robot 102 can include on board control features as well as external control features 101. For example, external control features 101 may include a robot controller 150, operator computer system 170, and a backend computer system 160. Positions within mining environment 500 can be defined with respect to a reference coordinate system having reference x, y, and z axes as illustrated in FIG. 1. Additional figures herein depict reference coordinate systems and positions within environments illustrated by such additional figures can be defined with respect to reference coordinate systems depicted. Referring to the reference z axis of the mining environment 500 of FIG. 1, drill holes 18 can have respective axes $z_1$, $z_2$ that are substantively parallel to reference axis z.

Figure 2:
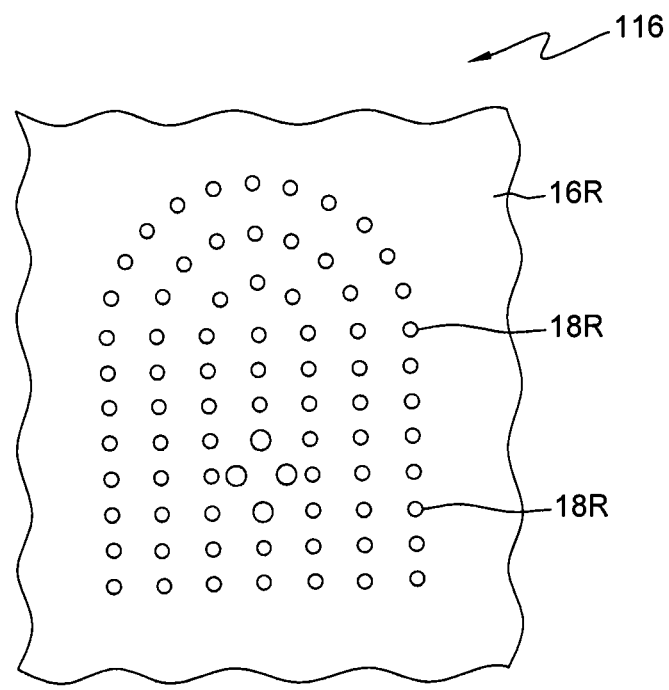
FIG. 2 is a representation of a drilling map in one embodiment.

Drill holes 18 may be previously formed using drilling equipment, e.g., a drill rig. Drill holes 18 can be formed at locations according to locations that are determined by blast engineers. At a drill hole formation stage, as shown in FIG. 2 along with FIG. 1, a drilling map 116 can be provided that includes data defining a plan for blasting of mining wall 16 represented by mining wall representation 16R in drilling map 116. Drilling map 116 can have recorded therein coordinates for locations of respective drill holes per a plan designed by a blast engineer and then, with use of drilling equipment drill holes 18 represented by drill hole representations 18R in drilling map 116 can be formed at the general location of the coordinates. In this way, drilling map 116 in one stage of its development can have information of the general location of the drill holes 18 but not a precise location of drill holes 18 because the drill holes 18 may not be formed precisely at the specified locations.

Drilling map 116 can be provided using, e.g., a combination of manual inputs and/or inputs from one or more sensor that senses surface geometry features of mining wall 16 represented by mining wall representation 16R in drilling map 116. In one embodiment, drilling map 116 can be provided in an intermediary form having surface geometry information. A blast engineer can examine the surface geometry information of drilling map 116 and can designate in drilling map 116 coordinate locations for drill holes 18 represented by drill hole representations 18R in drilling map 116. Drilling map 116 can be provided by a formatted computer file, e.g., in CAD format stored in a memory location of system 100 and can include a representation of the coordinates and dimensions of drill holes 18. The coordinates and dimensions can be expressed in two dimensions and/or three dimensions. In addition to having coordinate and dimension information of drill holes 18, drilling map 116 can include an index of drill holes 18 represented by drill hole representations 18R in drilling map 116. For example, each drill hole 18 represented by drill hole representations 18R in drilling map 116 can have an index identifier that can be designated by a blast engineer. There can be associated with an identifier for each drill hole 18 an identifier of a detonator package 510. In forming drilling map 116, a blast engineer can select a best detonator package 510 to associate with each drill hole 18 and can associate information identifying detonator package 510 to each drill hole 18, all of which information can be included in drilling map 116. In alternative embodiments, drilling map 116 can include a fewer number of information items or a larger number of information items than the information items described.

Referring further to FIG. 1, FIG. 1 illustrates one embodiment of mining environment 500 having system 100 according to an embodiment of the present disclosure for imaging an environment. In one embodiment, system 100 can be disposed within an underground area 12. System 100 can be regarded as a robot system or an imaging system. In this exemplary embodiment, system 100 may be used in the charging of a plurality of drill holes 18 in mining. For example, system 100 may be employed in underground mining and may generally include robot 102 having a camera system 104 (imager system). Camera system 104 can be included as part of tool assembly 102T and can be used for imaging mining wall 16 having plurality of drill holes 18. System 100 can be operative to obtain one or more image representation using camera system 104. In one embodiment the one or more image representation can include 3-dimensional (3D) point cloud image data. Camera system 104 can provide imaging functions enabling the robot to 'see' physical objects in its environment. Camera system 104 may be realized by proprietary and/or application-specific imaging device(s) or commercial off-the-shelf (COTS) offerings providing 2-dimensional (2D), 3-dimensional (3D), and/or depth-sensing imaging capabilities. An example COTS product is the Kinect® motion controller offered by Microsoft Corporation.

In one embodiment, system 100 can include magazine 15 (also shown in FIG. 9 and described in greater detail herein) for holding various detonator packages 510. In one embodiment, magazine 15 can be configured to assemble detonator packages 510 (also shown in FIG. 8 and described in greater detail herein). While reference to system 100 is made in the context of robotic or automated charging of drill holes 18 in mining, it will be readily appreciated by those skilled in the art that the technique of the present disclosure is applicable to other situations where imaging is needed of an environment with one or more features.

Figure 3:
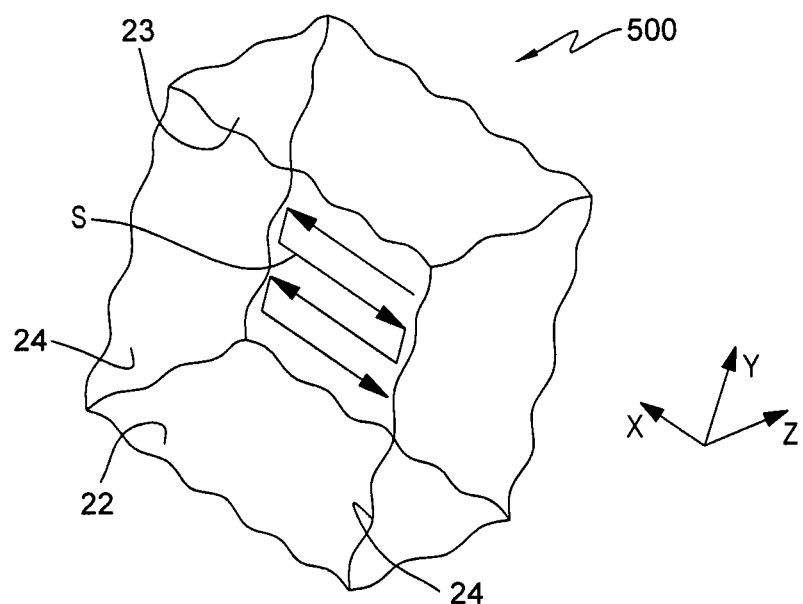
FIG. 3 is a schematic diagram illustrating a scan path within a mining environment in one embodiment.

FIG. 3 illustrates a three dimensional view of mining environment 500. With reference to FIGS. 1 and 3, mining environment 500 can include system 100 (FIG. 1) having robot 102 (FIG. 1), mining wall 16 having drill holes 18 (FIG. 1), a floor 22, a ceiling 23 and sidewalls 24 (FIG. 3).

Figure 4:
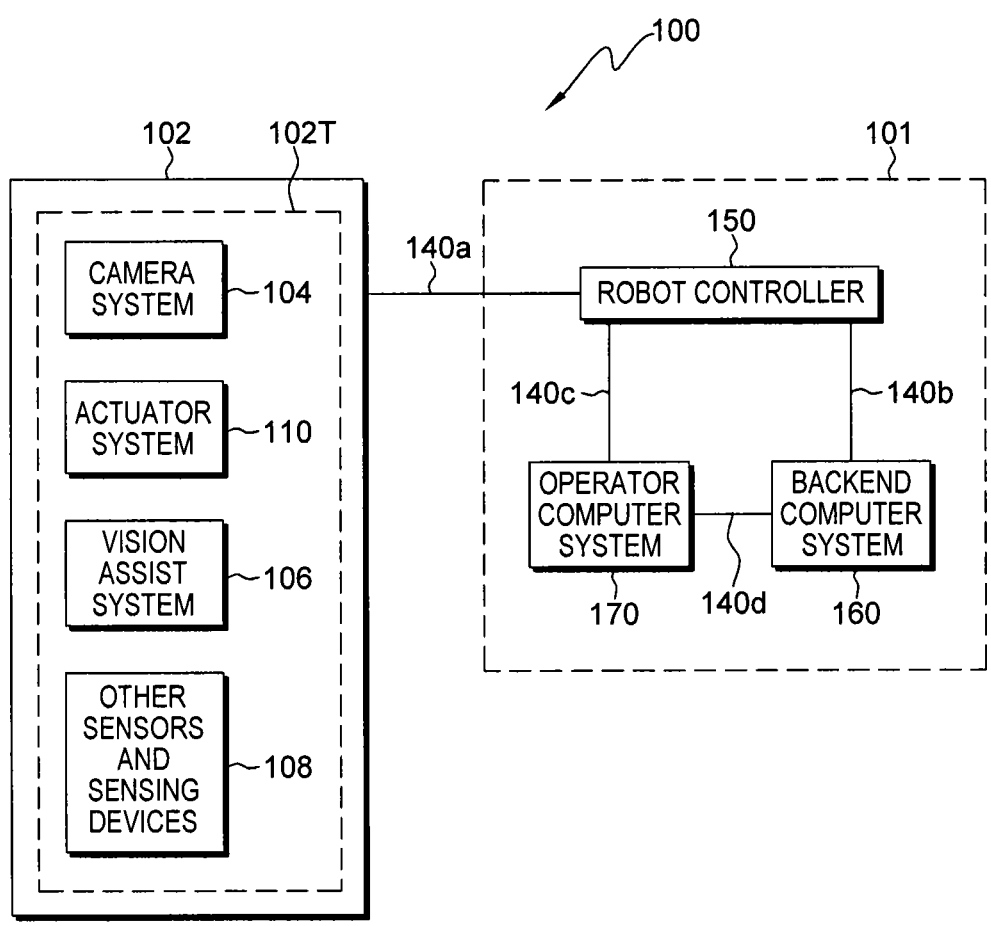
FIG. 4 is a schematic block diagram illustrating a system having a robot in one embodiment.

As shown in FIG. 4, system 100 can generally include robot 102 operably connected to robot controller 150, operator computer system 170, and backend computer system 160, which are operably coupled via communication links 140. Robot controller 150, operator computer system 170, and a backend computer system 160 can define external control features 101 of system 100. Components of external control features 101 are depicted at an elevation in underground area 12 and can be disposed at any location above ground or below ground and at any distance from robot 102. Components of external control features 101 can be located on site at a mining location and/or off site at a remote location. Operator computer system 170 can include one or more user interface through which one or more operator can input operator control that can be obtained for processing by system 100. Operator computer system 170 can permit teleoperation by one or more operator such as one or more local operator and/or one or more remote operator. Operator computer system 170 can be located locally to permit local teleoperation by a local operator and/or remotely to permit teleoperation by a remote operator.

Figure 24:
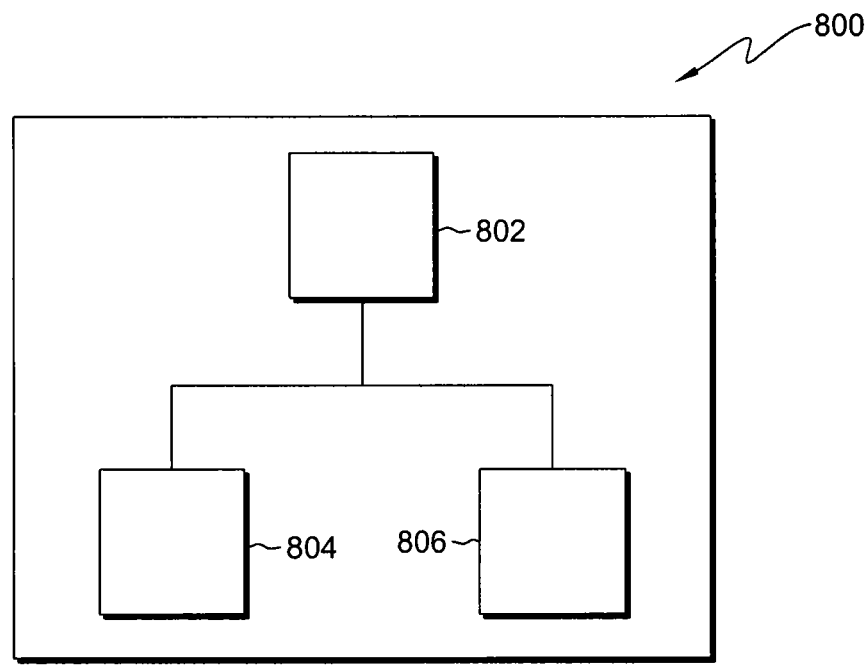
FIG. 24 is a schematic block diagram illustrating a computer system in one embodiment.

Operator computer system 170, in one embodiment as indicated in FIG. 1, can include local operator computer system and supervisor operator computer system and be distributed in both local and remote locations to permit operation by both one or more operator at a local location and one or more operator at a remote location. Robot 102 can include camera system 104, actuator system 110 (FIG. 4), vision assistance system 106 (FIG. 4), and other sensor/sensor devices 108 (FIG. 4). In one embodiment, camera system 104, actuator system 110, vision assistance system 106 (FIG. 4), and other sensor/sensing devices 108 (FIG. 4) can be included as part of tool assembly 102T. Robot 102, robot controller 150, operator computer system 170, and a backend computer system 160, each can have one or more computer system 800, (exemplary general features of which are described herein with reference to FIG. 24 herein).

In one embodiment, as illustrated by the enlarged view of FIG. 1, tool assembly 102T can be configured to hold a charging hose 202. Tool assembly 102T can be configured to move charging hose 202 forwardly and oppositely backwardly along longitudinal axis 204 of charging hose 202 as illustrated by double-headed arrow 206. Tool assembly 102T can be configured to rotate charging hose 202 in a first direction and a second opposite direction about longitudinal axis 204 of charging hose 202 as illustrated by curved double-headed arrow 208. Tool assembly 102T can include camera system 104 and can be disposed on a robot arm defined by links 102L and joints 102J, e.g., at an end of a robot arm. The components and operation of system 100 are described in greater detail herein.

Figure 5:
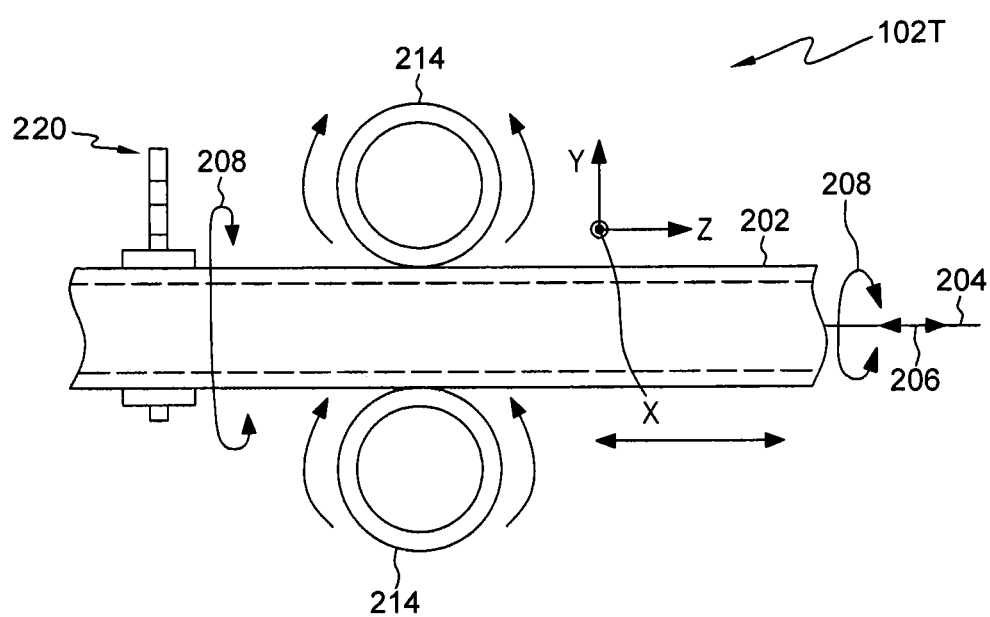
FIG. 5 is a schematic diagram illustrating a tool assembly for use in mining in one embodiment.

Further aspects of a tool assembly 102T in one embodiment are illustrated in FIG. 5 which provides a schematic view of tool assembly 102T. Tool assembly 102T can include first and second wheel actuators 214 for providing back and forth movement indicated by double-headed arrow 206 along axis of charging hose 202. Tool assembly 102T can include a chain actuator 220 for providing back and forth rotational movement of the charging hose 202 indicated by curved double-headed arrow 208 about longitudinal axis 204.

Figure 6:
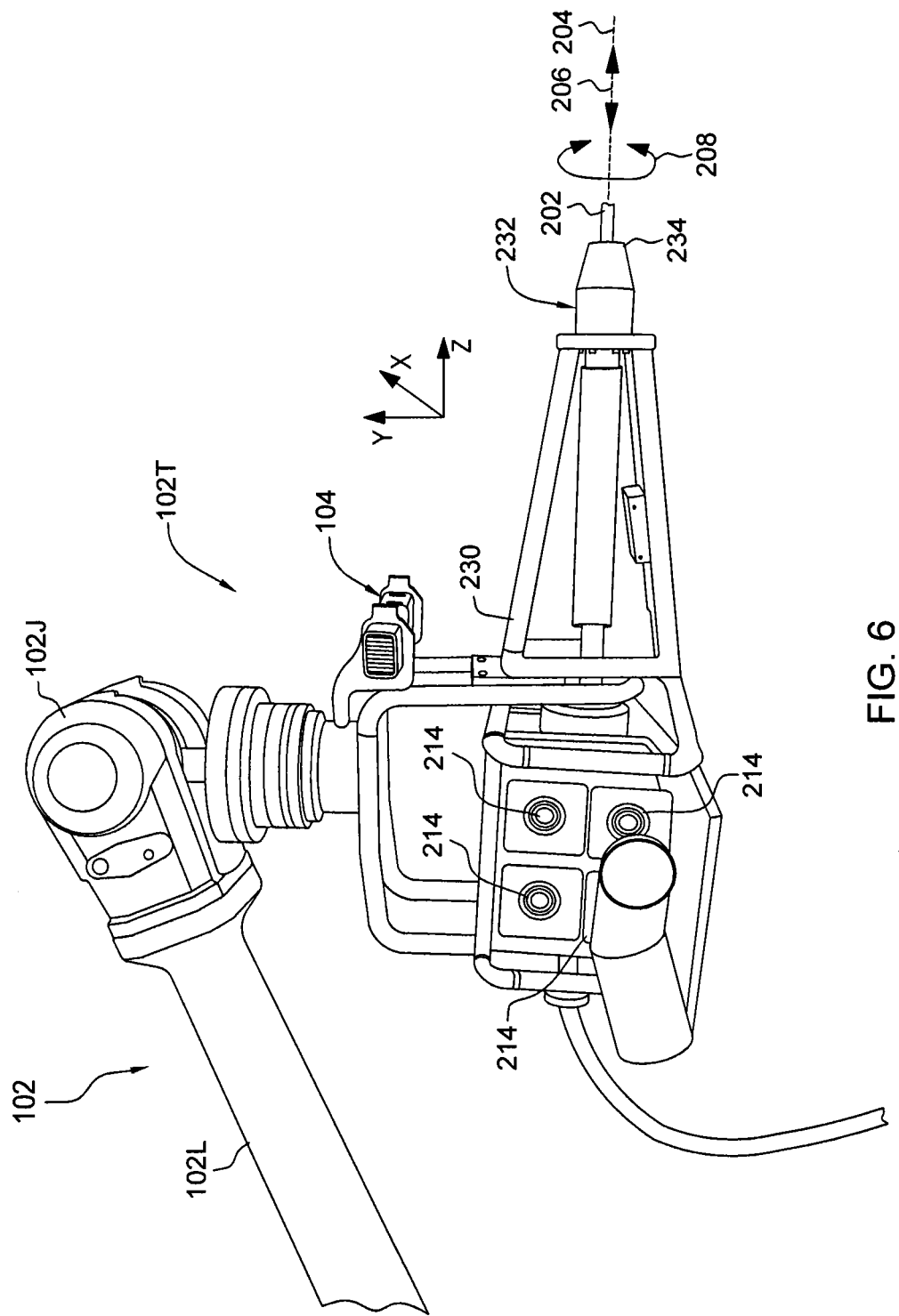
FIG. 6 is a perspective physical form view illustrating a tool assembly for use in mining in one embodiment.

A perspective physical form view of a tool assembly 102T is shown in FIG. 6. For example tool assembly 102T can include frame assembly 230 for supporting various components of tool assembly 102T. Tool assembly 102T can include sleeve 232 for guiding charging hose 202. Tool assembly 102T can include a plurality of wheel actuators 214 for providing back and forth movement of charging hose 202 along double-headed arrow 206 in a direction along longitudinal axis 204 of charging hose 202. A tool assembly 102T can also include camera system 104 disposed in a position with a view forward of a distal end 234 of tool assembly 102T.

Figure 7:
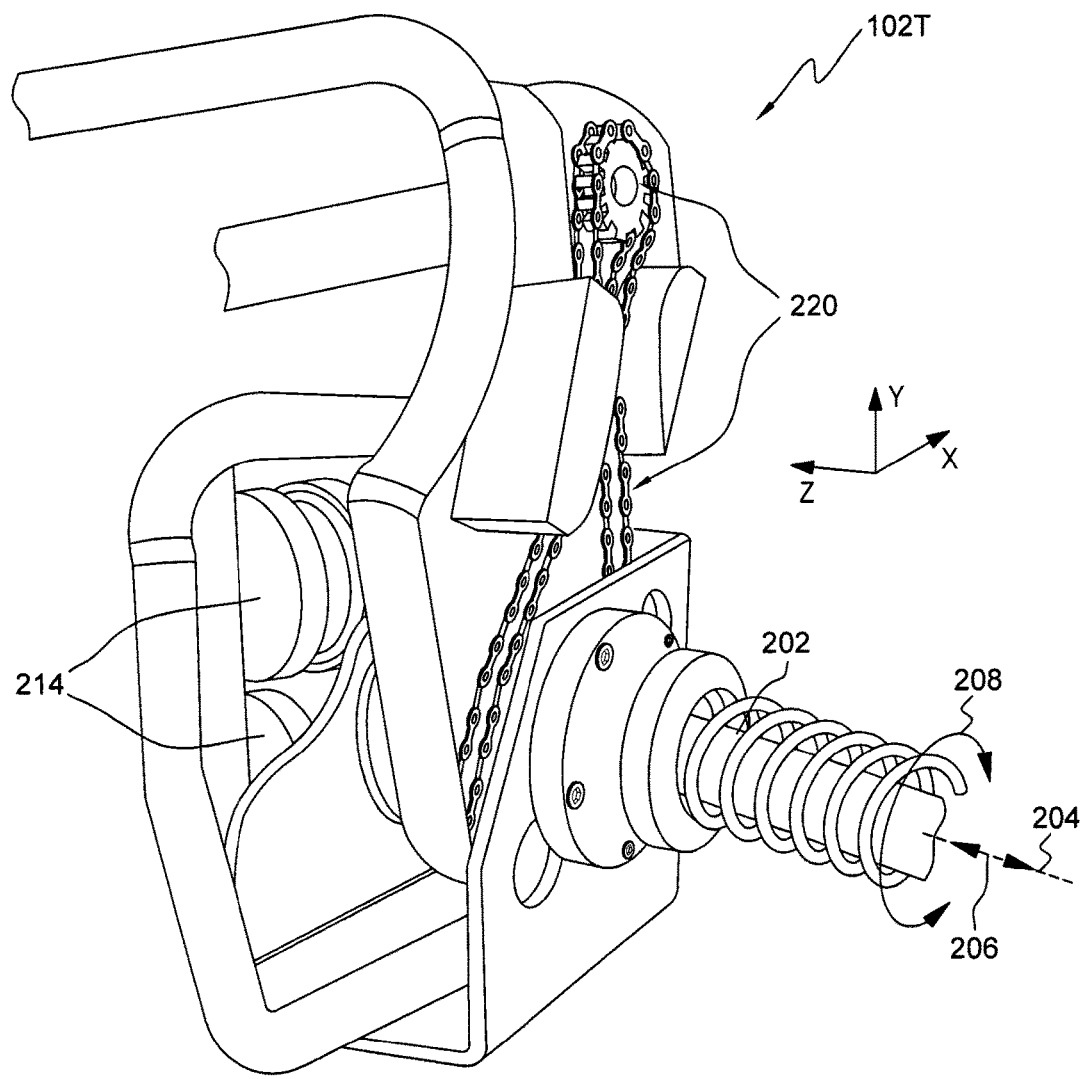
FIG. 7 is a perspective physical form view illustrating the tool assembly of FIG. 6 for use in mining in one embodiment.

FIG. 7 illustrates a rear perspective view of a tool assembly 102T. Tool assembly 102T can include wheel actuators 214 for providing back and forth movement of charging hose 202 along double-headed arrow 206 in a direction along longitudinal axis 204 of charging hose 202. Tool assembly 102T can include chain actuator 220 for providing movement of charging hose 202 along curved double-headed arrow 208 rotationally back and forth about longitudinal axis of charging hose 202.

Figure 8:
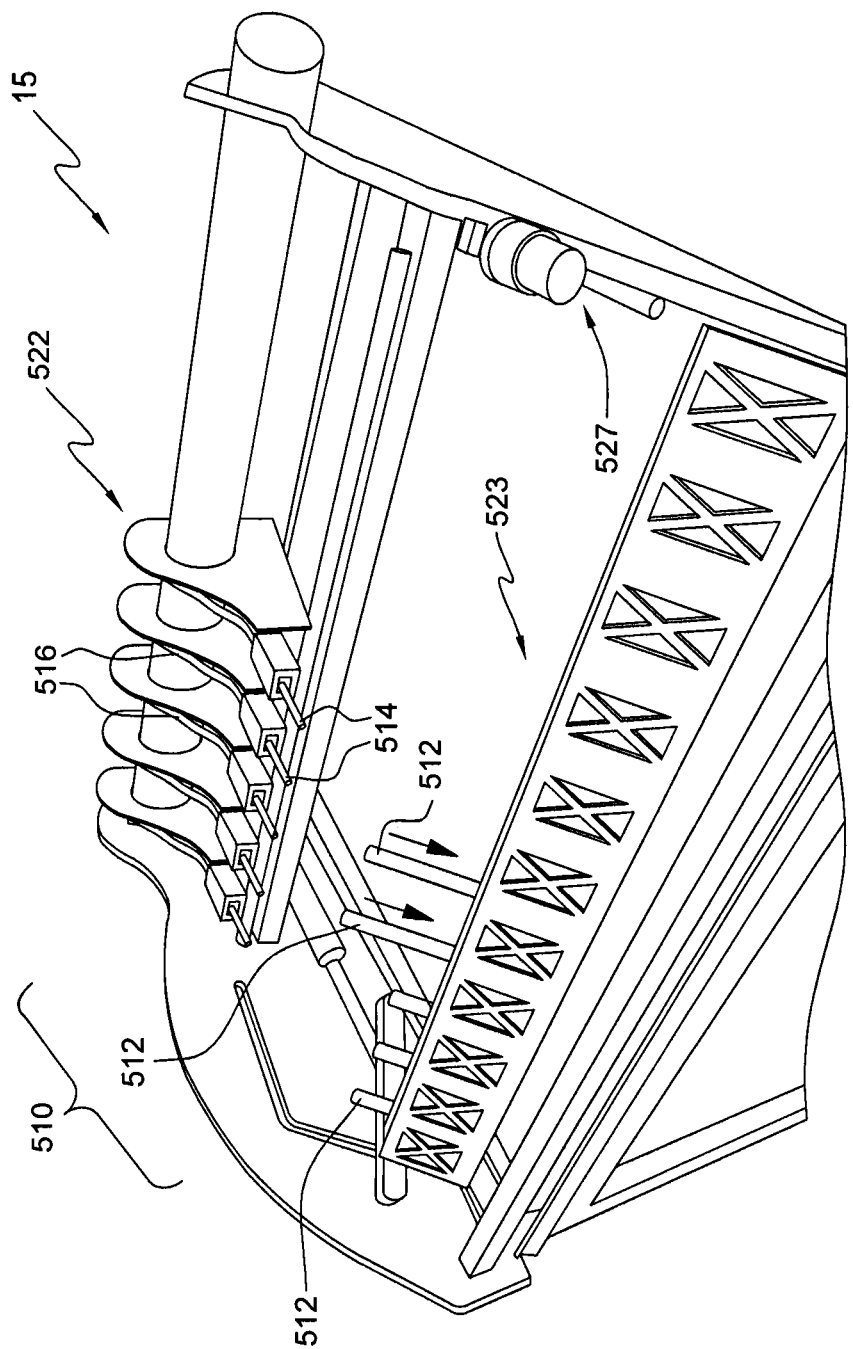
FIG. 8 is a perspective view of a magazine for holding a detonator package in one embodiment.
Figure 9:
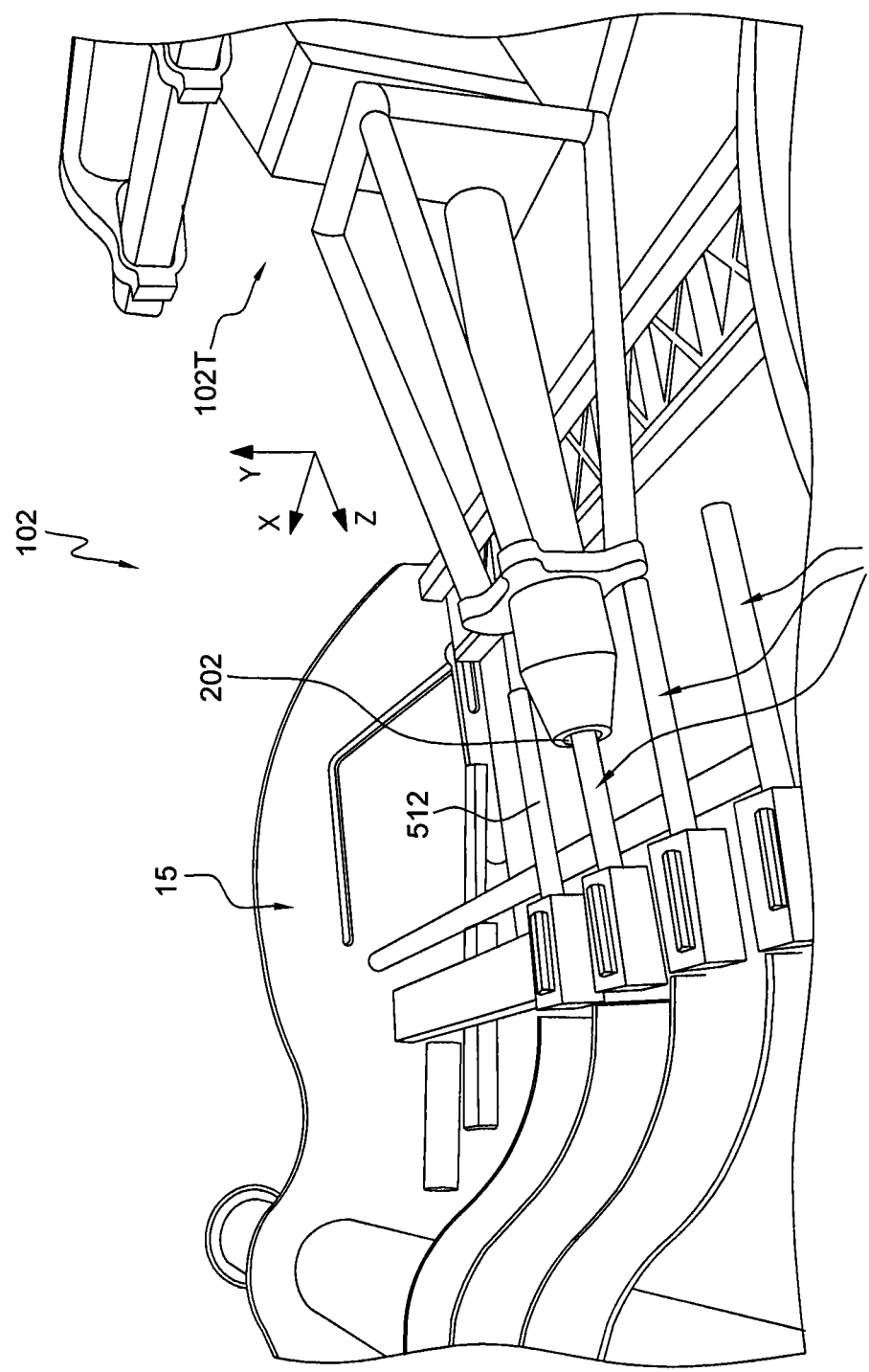
FIG. 9 is an operational perspective physical form view illustrating a robot in mining environment picking up a detonator package from the magazine of FIG. 8 in one embodiment.

FIGS. 8 and 9 further illustrate magazine 15 for holding a plurality of detonator packages 510. As shown in FIG. 8 each detonator package 510 can include detonator primer 512, detonator 514, and signal wire 516. Magazine 15 can include a first area 522 for holding detonators 514 (with respective signal wires 516 preattached thereto) and a second area 523 for holding primers 512. Detonators 514 with extending signal wires 516 and primers 512 can be placed on magazine 15 separately and magazine 15 can be operative so that when magazine 15 is appropriately actuated, magazine 15 can assemble one or more primer 512 to one or more detonator 514 at second area 523.

FIG. 9 illustrates robot 102 having tool assembly 102T in use picking up a detonator package 510. For picking up a detonator package 510 a distal end of charging hose 202 can extend from a distal end of tool assembly 102T. Charging hose 202 can be configured to be friction fit about a primer 512 of a detonator package 510. Tool assembly 102T can be moved to be friction fit about a primer 512 to thereby pick up detonator package 510 having primer 512. Referring again to FIG. 8, magazine 15 can include orientation feature 527. Robot 102 with tool assembly 102T can be operated in an automatic mode of operation or teleoperation mode to be disposed about feature 527 having coordinates that are fixed and known in relation to remaining locations of magazine 15. Accordingly, by being operated so that tool assembly 102T is disposed about feature 527 precise coordinate information as to all locations of system 100 can be recorded by system 100.

Figure 10:
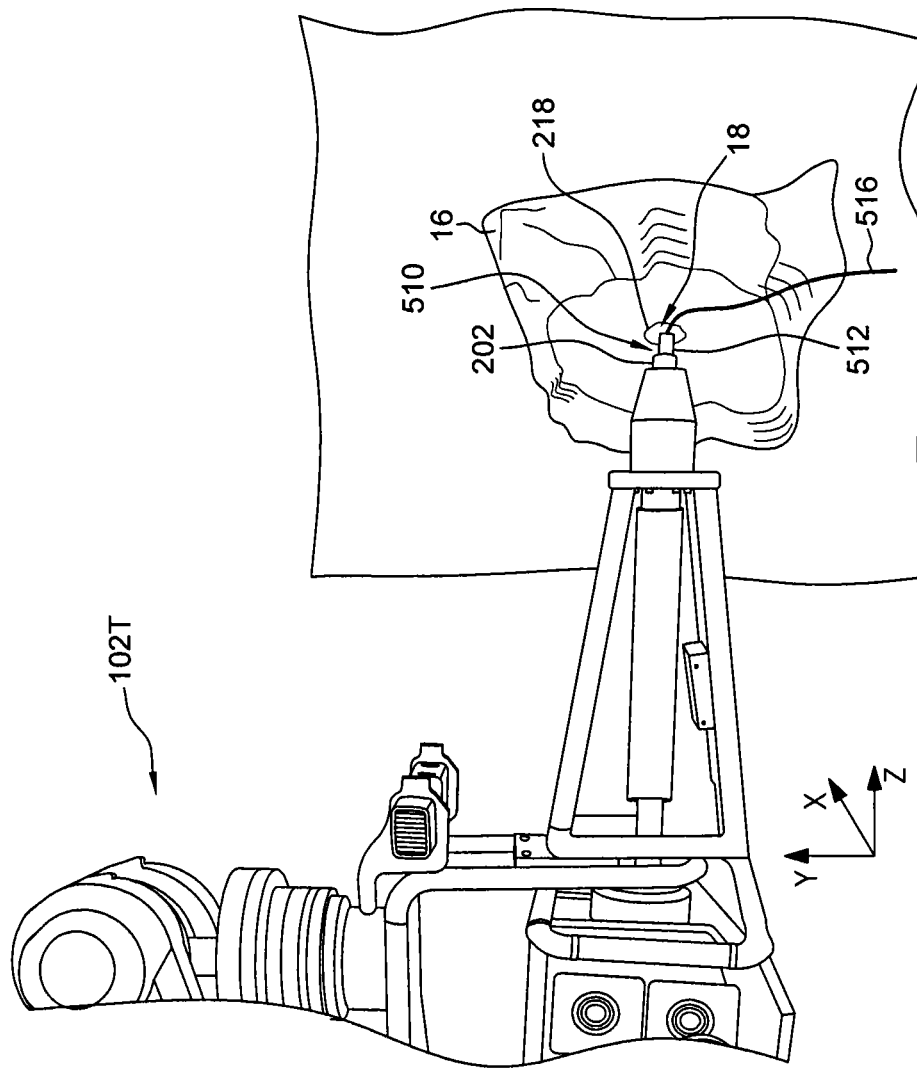
FIG. 10 is an operational perspective physical form view illustrating a robot in mining environment performing visual servoing for positioning a charging component for drill hole entry in one embodiment.
Figure 11A:
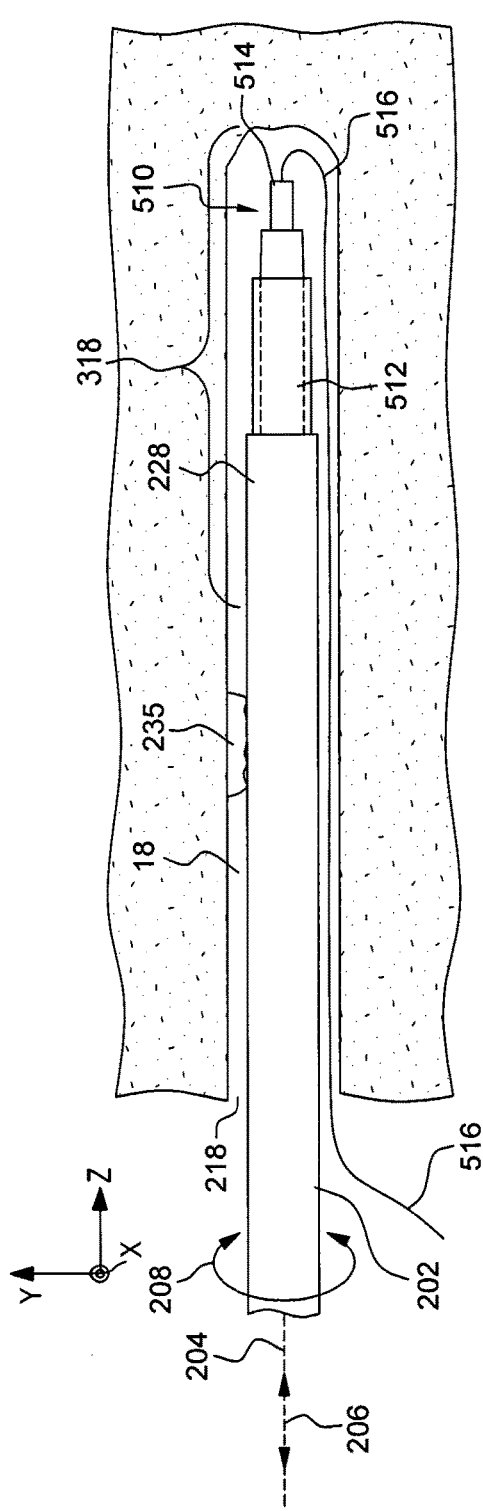
FIG. 11A is a schematic side view illustrating a drill hole with a charging hose and a detonator package disposed therein in one embodiment.
Figure 11B:
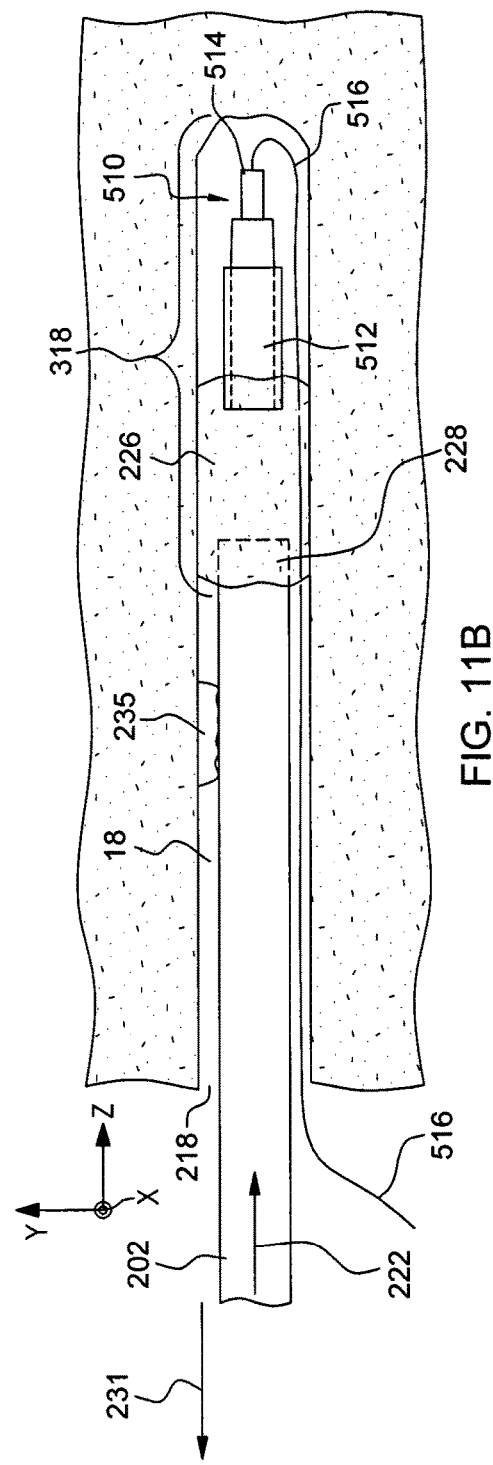
FIG. 11B is a schematic side view illustrating a drill hole with a charging hose in a state of being retracted by a robot in one embodiment.

FIG. 10 illustrates tool assembly 102T in use positioning a detonator package 510 for entry (insertion) into a drill hole 18, e.g., at a position adjacent an opening 218 of a drill hole 18. FIG. 10 illustrates that charging hose 202 held by tool assembly 102T can hold primer 512 to thereby hold detonator package 510, the detonator package 510 having primer 512, detonator 514 and signal wire 516. When charging hose 202 with robot 102 is moved toward a distal end 318 of drill hole 18, primer 512 of detonator package 510 can be moved to a distal end 318 of drill hole 18 and a signal wire 516 of detonator package 510 as shown can extend backwardly and generally coextensively with charging hose 202 (generally running adjacent to an exterior of charging hose 202) so that signal wire 516 can be accessible from a location externally from drill hole 18 as shown in FIGS. 11A and 11B. FIG. 11B illustrates charging hose 202 being retracted from drill hole 18 by robot 102 in a direction indicated by arrow 231. As charging hose 202 is being retracted, explosive material 226 can be pumped in through charging hose 202 so that when charging hose 202 is retracted, there is left within drill hole 18 a deposit of explosive material 226 which can be later detonated using detonator package 510. In one embodiment, a distal end 310 of drill hole 18 can refer to an areas of drill hole 18 spaced apart from an opening 218 of drill hole 18. In one embodiment a distal end 318 of drill hole 18 can be indicated by a threshold distance from an opening 218 of drill hole 18 specified by a blast engineer and recorded in drilling map 116. In one embodiment a distal end of drill hole 18 can be indicated by a threshold distance from a drill hole opening 218, the threshold distance regarded as sufficient for performance of blasting by a blast engineer and/or an operator of system 100.

With reference again to FIG. 1, system 100 can have an automated mode of operation in which robot 102 with tool assembly 102T automatically performs a charging component positioning procedure for controlling a positioning of the charging component. A charging component as set forth herein in one embodiment can include one or more charging component, e.g. one or more of charging hose 202, detonator package 510, one or more component of a detonator package 510 (e.g. primer 512, detonator 514, and or/signal wire 516) and/or explosive material 226. System 100 can have a teleoperation mode of operation in which robot 102 with tool assembly 102T performs the charging component positioning procedure for controlling the positioning of the charging component based on one or more operator input. A charging component positioning procedure can be a procedure for positioning a charging component for entry into drill hole 18. A charging component positioning procedure can be a procedure for moving a charging component from an opening 218 of drill hole 18 to a distal end of drill hole 18 inclusive or any obstruction avoidance component positioning routine performed for moving a charging component from an opening 218 of drill hole 18 to a distal end of drill hole 18. A charging component positioning procedure can be a procedure for overcoming an obstruction within drill hole 18. In one embodiment, for a time that an automated mode of operation is active, functions performed by system 100 can be independent of any current input of an operator. In one embodiment, for the time that an automated mode of operation is active, robot 102 with tool assembly 102T can move the charging component to perform the charging component positioning procedure independent of any current input of an operator.

In one embodiment, system 100 can be configured so that system 100 transitions from an automated mode to a teleoperation mode based on a sensed condition sensed by system 100 e.g. using one or more image representation obtained using camera system 104. In one embodiment, system 100 can have a manual override feature and can be configured so that system 100 transitions from an automated mode to a teleoperation mode based on an input of an operator entered using a user interface of operator computer system 170. As has been noted operator computer system 170, in one embodiment, can include local operator computer system and supervisor operator computer system and be distributed in both local and remote locations to permit operation by both one or more operator at a local location and one or more operator at a remote location. In one embodiment, system 100 can be configured so that the remote supervisor operator computer system has priority over the local operator computer system. In one embodiment, system 100 can be configured so that system 100 disables a local operator computer system based on one or more operator input entered into a user interface of a remote supervisor operator computer system of operator computer system 170.

One or more computer system of system 100, e.g., one or more computer system of robot 102, robot controller 150, operator computer system 170 or backend computer system 160 can be configured to perform particular operations or actions by virtue of having software, firmware, hardware, or a combination of them installed on the one or more computer that in operation causes or cause the one or more computer to perform the actions. One or more computer program can be configured to perform particular operations or actions by virtue of including instructions that, when executed by data processing apparatus (e.g., one or more processor of one or more computer), cause the apparatus to perform the actions such as the methods shown in FIGS. 12-19 as described in greater detail herein.

Figure 12:
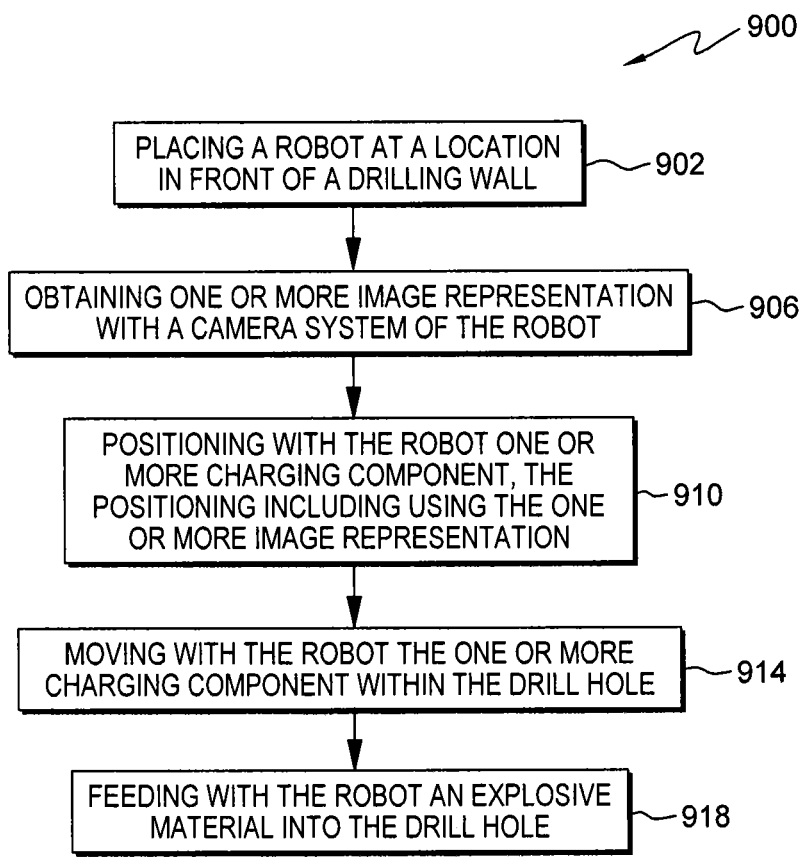
FIG. 12 is a flow diagram illustrating a method for charging in one embodiment.

Referring to the flow diagram of FIG. 12, one general aspect can include a method 900 for charging one or more drill hole 18 in mining wall 16.

In reference to the method of FIG. 12, there is set forth herein in one embodiment a method 900 comprising at block 902 placing a robot 102 having a tool assembly 102T that includes a camera system 104 at a position in front of a mining wall 16, the robot 102 obtaining at block 906 one or more image representation using the camera system 104, positioning at block 910 one or more charging component for entry into drill hole 18, moving at block 914 with the robot 102 the one or more charging component within the drill hole 18, and feeding at block 918 with the robot 102 explosive material into the drill hole 18. The moving at block 914 can include in one embodiment inserting with the robot 102 one or more charging component into a drill hole 18. The moving at block 914 can include in one embodiment moving with the robot 102 one or more charging component from an opening 218 of a drill hole 18 to a distal end 318 (FIG. 11B) of a drill hole 18. The moving at block 914 can include in one embodiment moving with the robot 102 one or more charging component to a distal end 318 (FIG. 11B) of a drill hole 18.

In one embodiment the one or more image representation obtained at block 906 can include 3D point cloud image data. The obtaining of image data at block 906 in one embodiment can include performing a prescan to obtain one or more image representation of a mining wall to determine major boundaries of a mining wall, performing a scan to obtain one or more image representation for use in determining a scan path and performing visual servoing. On performing visual servoing, a robot 102 can obtain one or more image representation and holding the one or more charging component can use the one or more image representation obtained with a robot camera system 104 to precisely locate the one or more charging component. One or more image representation can represent a mining wall, e.g. an entire mining wall 16 or a portion of a mining wall 16 such as a portion having a drill hole 18. An image representation can be obtained using camera system 104 in one embodiment in response to operating camera system 104 for capture of an image representation. An image representation can be obtained using camera system 104 in one embodiment by merging image data of a plurality of obtained image representations. In one embodiment, for obtaining an image representation using camera system 104 system 100 can merge together image data from a plurality of image representations representing the plurality of portions of mining wall 16. In one embodiment, for obtaining an image representation using camera system 104 system 100 can merge together image data of a plurality of image representations where one or more of the plurality of image representations can be obtained by system 100 e.g. in response to operating camera system 104 for capture of an image representation.

A method as set forth in reference to the flow diagram of FIG. 12 in one embodiment can use drilling map 116. For example, in the performance of a scan, pre-scan or visual servoing which can be performed as part of the robot obtaining image data at block 906 can use coordinates of the drilling map 116 to determine an initial area of interest on a mining wall 16 on which to locate a field of view of camera system 104. In another aspect, system 100 can process obtained image data to detect drill holes 18 which drill holes 18 if drilled according to a drilling map 116 should have corresponding drill hole representations 18R (FIG. 2) identified on drilling map 116. In one aspect a system 100 can register detected drill holes 18 detected by processing of image data captured using camera system 104. In one aspect when a system 100 detects a drill hole 18 represented in obtained image data system 100 can perform registration of a drill hole 18 by associating a flag to drill hole identifier of drilling map 116 so that the drill hole 18 identified by the identifier is designated as being detected in obtained image data. System 100 can use a pattern recognition process to detect a drill hole 18 and/or other features represented in one or more image representation obtained using camera system 104. The pattern recognition process can employ one or more pattern recognition technology e.g. one or more of clustering algorithms, ensemble learning algorithms, classification algorithms, sequence labeling algorithms, regression algorithms, or multilinear subspace learning algorithms.

In one embodiment a method as set forth in reference to the flow diagram of FIG. 12 can include use of a magazine 15 features of which are described in one embodiment in reference to FIGS. 1, 8 and 9. In one embodiment, the magazine 15 can hold one or more charging component, e.g. detonator package 510 and/or one or more component of a detonator package 510 such as a primer 512, a detonator 514 or a signal wire 516. In one embodiment, a magazine 15 can be adapted to assemble components of a detonator package 510. In one embodiment a method according to the flow diagram of FIG. 12 can include picking up one or more charging component when the one or more charging component is in a state held by magazine 15.

The flow diagram of FIG. 12 illustrates general features of a charging method in one embodiment. Flow diagrams of FIGS. 13-19 illustrate specific examples of processes for use in charging methods that can be performed in the performance of the general method generally described with reference to the flow diagram of FIG. 12.

One or more computer system of system 100, e.g., one or more computer system of robot 102, robot controller 150, operator computer system 170 or backend computer system 160 can be configured to perform particular operations or actions by virtue of having software, firmware, hardware, or a combination of them installed on the one or more computer that in operation causes or cause the one or more computer to perform the actions. One or more computer program can be configured to perform particular operations or actions by virtue of including instructions that, when executed by data processing apparatus, cause the apparatus to perform the actions. Referring to the flow diagram of FIG. 13, one general aspect can include a method 1000 for charging a drill hole 18 in mining wall 16.

Figure 13:
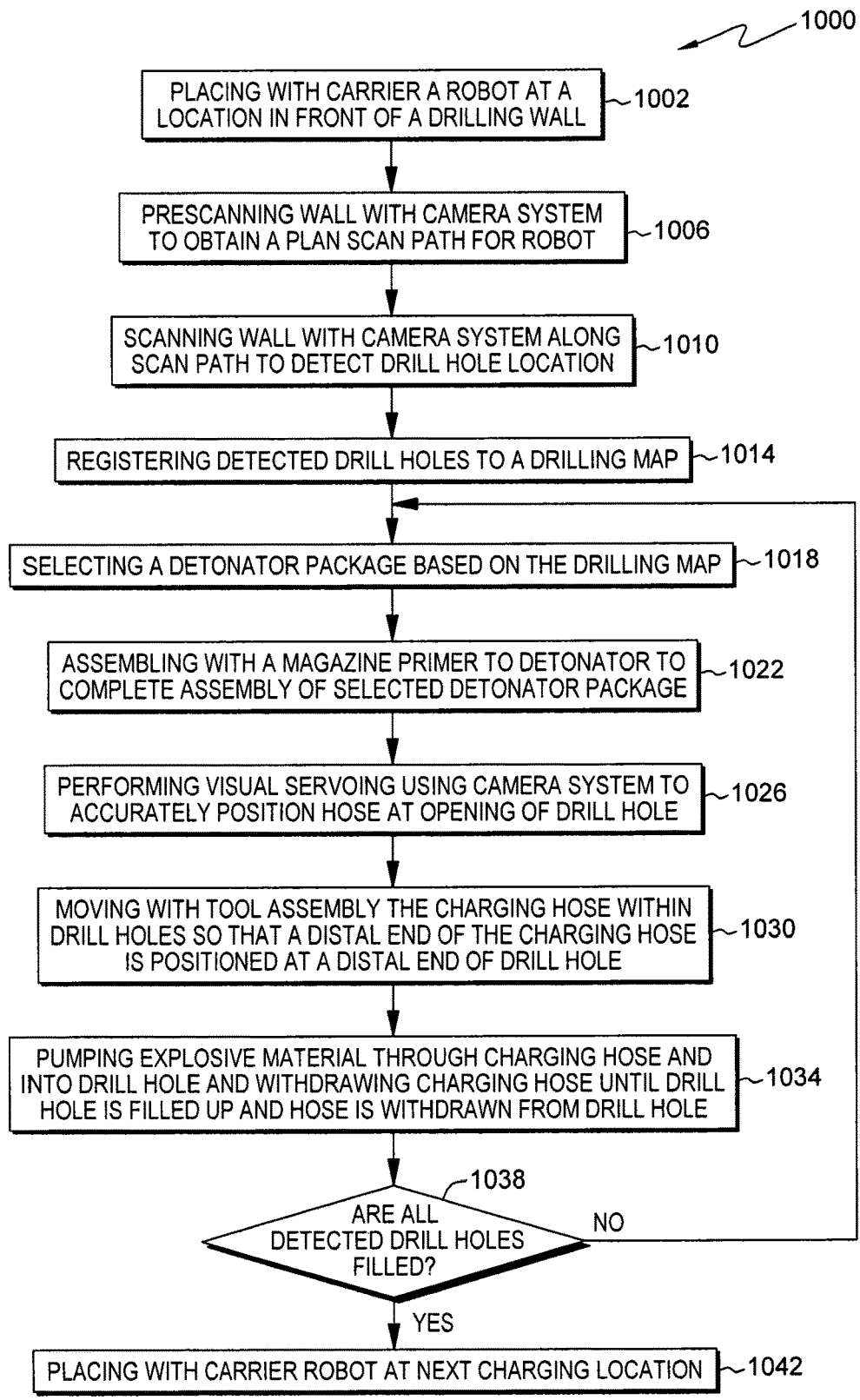
FIG. 13 is a flow diagram illustrating a method for charging in one embodiment.

As shown in FIG. 13 and mining environment 500 of FIG. 1, method 1000 can include at block 1002 placing with carrier 14 robot 102 at a location in front of mining wall 16 adjacent to a front surface of mining wall 16. The method can include at block 1006, performing a prescan to prescan mining wall 16 with camera system 104 to obtain one or more image representation of a mining wall 16 and planning a scanning path S (FIG. 3) for the robot using the one or more image representation. An image representation obtained at block 1006 can be regarded as a prescan image representation. System 100 can determine scanning path S in a manner that collision of robot 102 with major surfaces e.g., mining wall 16, sidewalls 24, floor 22, and ceiling 23 can be avoided. A method can include at block 1010 performing a scan as set forth herein and detecting a drill hole 18 represented in one or more image representation. The one or more image representation in which a drill hole 18 can be detected at block 1010 can be a scan image representation in one embodiment as set forth herein. A method can include at block 1014 registering detected drill holes 18 detected at block 1010 on drilling map 116 (FIG. 2). System 100 can be operative so that system 100 registers drill hole 18 on drilling map 116 (FIG. 2) if system 100 detects in an image representation of a representation of a drill hole 18.

The registering at block 1014 can link detected drill holes to indexed identifiers for drill holes, which can provide linking between detected drill holes, including image data for the detected drill holes, to information in drilling map 116 (FIG. 2) of the various drill holes such as detonator packages 510 associated to each drill hole 18. It has been noted that a drilling map 116 can include a coordinates for drill holes 18 that can be designed coordinated designated by a blast engineer. Embodiments herein recognize that drill holes 18 may not actually be drilled at the precise locations of the designed coordinates. When system 100 detects drill holes 18 by processing image data system 100 can update or supplement the designed coordinate hole location with the coordinates of the detected actual drill holes 18 detected by processing of image data.

Embodiments of system 100 herein can include automated operating modes and/or teleoperation operating modes. In one example of an automated operating mode, system 100 can charge drill holes 18 of mining wall 16 in an order determined by a sequence of hole identifiers of drilling map 116 (FIG. 2). As noted, drilling map 116 (FIG. 2) can include hole identifiers and that each hole identifier can have an associated detonator package 510 which can be designed and designated by a drilling engineer. These drill hole identifiers have a sequence, e.g., as determined by their identifier or can be designated to have a sequence. A method can include at block 1018 selecting with system 100 a detonator package 510 based on drilling map 116 (FIG. 2). System 100 at block 1018 can be charging a certain drill hole 18 of a sequence of drill holes and selecting of detonator package 510 at block 1018 can be based on an identifier of the current drill hole 18 of a sequence of drill holes being charged. As noted drilling map 116 (FIG. 2) can include information indicating a detonator package 510 associated to each drill hole 18, wherein each drill hole 18 can be identified with an identifier. At block 1018, system 100 can look up a detonator package 510 associated to a current drill hole 18 being subject to charging in drilling map 116 (FIG. 2) to identify detonator package 510 associated to a current drill hole.

As an alternative to the processing described with reference to block 1018 (automated operating mode selection of a detonator package) system 100 can operate in a teleoperation mode so that selection of a detonator package 510 based on an operator input. In one embodiment, operator computer system 170 can include a user interface allowing an operator to observe data of system 100 and to enter control information for selection of a detonator package 510. Reviewing data of system 100 (e.g. by visual observation) an operator can enter one or more operator input using a user interface of operator computer system 170 to designate a selection if a detonator package 510 for a current drill hole 18. It is noted that drilling map 116 can include characterizing information that associates indexed drill holes 18 identified by identifiers to various particular detonator packages 510. In one embodiment, a selecting at block 1018 can include selecting an indexed drill hole 18 of a mining wall 16 with a detonator package 510 associated to the drill hole 18 based on an operator input. A method therefore allows an operator to select an order of drill holes 18 to charge. The data on which a selection can be based can include e.g., location or dimensions of a drill hole 18 and/or image data such as image data of a one or more image representation obtained at block 1206.

A method can include at block 1022 assembling with magazine 15 a primer 512 (FIG. 8) to detonator 514 (FIG. 8) having a signal wire 516 (FIG. 8) attached thereto to complete assembly of a selected detonator package 510. A method can include at block 1022 picking up with tool assembly 102T a detonator package 510. The picking up detonator package 510 can include moving with robot 102 charging hose 202 into position in relation to magazine 15 to pick up a designated detonator package 510. For picking up a selected detonator package 510, charging hose 202 (FIG. 9) (which in some embodiments can include an adapter fittable into a major body of charging hose 202) can be shaped to be friction fit about primer 512 (FIG. 9) of detonator package 510. As shown in FIG. 9, detonator package 510 can be held in fixed position by magazine 15 so that when charging hose 202 is moved in relation to magazine 15 charging hose 202 (with or without adapter thereto) can be friction fit about the primer 512 to associate detonator package 510 to charging hose 202.

With reference again to FIG. 13 and FIG. 1, a method 1000 can include at block 1026 performing visual servoing using camera system 104 to accurately position charging hose 202 (FIG. 10) for entry into a drill hole 18, e.g. by positioning charging hose 202 and one or more additional charging component held therein at an opening 218 of drill hole 18. During performance of visual servoing, system 100 can control robot 102 responsively to image data currently obtained using camera system 104 for entry of one or more charging component (e.g. charging hose 202 and detonator package 510 held therein) into drill hole 18. Image data currently obtained can refer to image data contemporaneously obtained. An image representation obtained during performance of visual servoing can have one or more different characteristic than an image representation obtained during a prescan. A visual servoing image representation can have a higher resolution than a prescan image representation. In some embodiments, performance of visual servoing image capture can switch from a 3D format to a 2D format to permit faster obtaining of image representations.

A method 1000 can include at block 1030 moving with tool assembly 102T charging hose 202 within drill hole 18 so that distal end 228 of charging hose 202 is positioned at a distal end 318 of drill hole 18 (e.g., as shown in FIGS. 11A and 11B). Moving at block 1030 can include inserting with tool assembly 102T charging hose 202 into drill hole 18. Moving charging hose 202 at block 1030 so that charging hose 202 is positioned at a distal end of drill hole 18 can include e.g. moving charging hose 202 with tool assembly 102T within drill hole 18 to perform pushing forward and/or retracting back charging hose 202 and/or rotating charging hose 202 to overcome an obstruction in drill hole 18 to facilitate advance of charging hose 202 toward distal end 318. To perform inserting of charging hose 202 in drill hole 18, tool assembly 102T can be configured to hold charging hose 202. Tool assembly 102T, can be configured to move charging hose 202 forwardly and oppositely backwardly illustrated by double-headed arrow 206, along longitudinal axis 204 of charging hose 202. Tool assembly 102T, can be configured to rotate charging hose 202 in first and second opposite directions as illustrated by curved double-headed arrow 208, about longitudinal axis 204 of charging hose 202. System 100 can have an automated mode of operation in which the robot 102 with tool assembly 102T automatically performs a charging component positioning procedure for controlling a position of one or more charging component e.g. charging hose 202. System 100 can have a teleoperation mode of operation in which the robot with tool assembly 102T performs the charging component positioning procedure for controlling the position of the one or more charging component based on one or more operator input. In one embodiment, the component positioning procedure can be a procedure for moving one or more charging component from an opening 218 of drill hole 18 to a distal end 318 (FIGS. 11A and 11B) of drill hole 18, inclusive of any obstruction avoidance component positioning routine performed for moving one or more charging component from an opening 218 of drill hole 18 to a distal end 318 of drill hole 18.

As illustrated in reference to FIG. 11B a method 1000 can include at block 1034 system 100 with use of a pump (not shown), pumping an explosive material 226 through charging hose 202 and into drill hole 18 and retracting with tool assembly 102T charging hose 202 until charging hose 202 is retracted completely from drill hole 18.

A method 1000 can include at block 1038 system 100 determining whether all detected drill holes 18 are filled. On completion of each explosive material fill, drilling map 116 (FIG. 2) can be updated to include an indicator of the completed step. Accordingly, system 100 can determine whether all drill holes 18 are filled by examining drilling map 116 (FIG. 2). If system 100 determines at block 1038 that all drill holes 18 have not been filled, system 100 can return to block 1018 to select another detonator package 510. In accordance with method 1000 of the flow diagram of FIG. 13, a next detonator package 510 and a next drill hole 18 to charge can be based on a sequence of drill holes 18 and associated detonator packages 510 that have been recorded in drilling map 116 (FIG. 2). If system 100 determines at block 1038 that all drill holes 18 have been filled, a method can proceed to block 1042. A method can include at block 1042 placing with carrier 14 robot 102 at a next charging location, e.g., at a next mining wall 16.

In the method 1000 of the flow diagram of FIG. 13 along with reference to FIG. 1, carrier 14 can place the robotic charging system having robot 102 in front of a mining wall 16, where drill holes 18 are drilled. A camera system 104, for example, a 3D camera system on the robot 102 can quickly rotate to scan the environment surrounding robot 102, and system 100 can use the image data obtained from camera system 104 to plan a collision free scanning path S (FIG. 3) for the robot 102. Camera system 104 can scan mining wall 16 using the scanning path S (FIG. 3), and system 100 can collect point cloud data of each frame along the path to obtain a 3D image representation of a scene, then detect drill hole 18 locations. System 100 can determine whether detected drill holes 18 match to drill hole representations 18R of drilling map 116 (FIG. 2). Drilling map 116 (FIG. 2) can provide information of the rough relative location of the drill holes 18 and drilling map 116 (FIG. 2) can also provide information identifying a detonator package 510 to each drill hole 18. System 100 can register each detected drill hole location to drilling map 116. For performing a registration, system 100 can raise a flag in drilling map 116 for each drill hole representation 18R of drilling map 116 (FIG. 2) to indicate that drill hole 18 corresponding to the drill hole representation 18R has been located. Image data obtained using camera system 104 can be associated to each drill hole representation 18R of drilling map 116 (FIG. 2). After registering the detected drill holes 18 to the drilling map 116 at block 1014 the system 100 can automatically select the drill hole 18 and corresponding detonator package 510 to perform charging. A magazine 15 can hold detonator packages 510. Magazine 15 can automatically assemble a primer 512 to a detonator 514 (e.g. a signal tube) to complete assembly of a detonator package 510 (block 1022). A robot 102 can pick up the assembled detonator package 510 by way of inserting detonator package 510 into the tip of charging hose 202. Based on the detected location of a current drill hole 18, robot 102 can move charging hose 202 to approach to drill hole 18 on mining wall 16. Then, robot 102 can perform visual servoing to accurately position charging hose 202 at the opening 218 of drill hole 18 on mining wall 16. Once the positioning is completed, a tool assembly 102T of robot 102 can insert charging hose 202 into drill hole 18 with the detonator package 510. System 100 can detect if there is an obstruction in drill hole 18. If there is an obstruction in drill hole 18, tool assembly 102T can move charging hose 202 within drill hole 18 to attempt to overcome the obstruction, e.g. push forward and retract back, rotate to overcome the obstruction. After charging hose 202 reaches the end of drill hole 18, the system 100 can pump explosive material into drill hole 18 and tool assembly 102T can retract charging hose 202 until drill hole 18 is filled up and charging hose 202 is retracted completely out of drill hole 18. Then system 100 can work on the next detected drill hole 18. After all the detected drill holes 18 represented in drilling map 116 are filled, the charging process is completed in a current location. Carrier 14 can place the robot 102 at a next location.

One or more computer system of system 100, e.g. one or more computer system of robot 102, robot controller 150, operator computer system 170 or backend computer system 160 can be configured to perform particular operations or actions by virtue of having software, firmware, hardware, or a combination of them installed on the one or more computer that in operation causes or cause the one or more computer to perform the actions. One or more computer program can be configured to perform particular operations or actions by virtue of including instructions that, when executed by data processing apparatus, cause the apparatus to perform the actions. Referring to the flow diagram of FIG. 14, one general aspect can include a method 1100 for charging a drill hole 18 in a mining wall 16.

Figure 14:
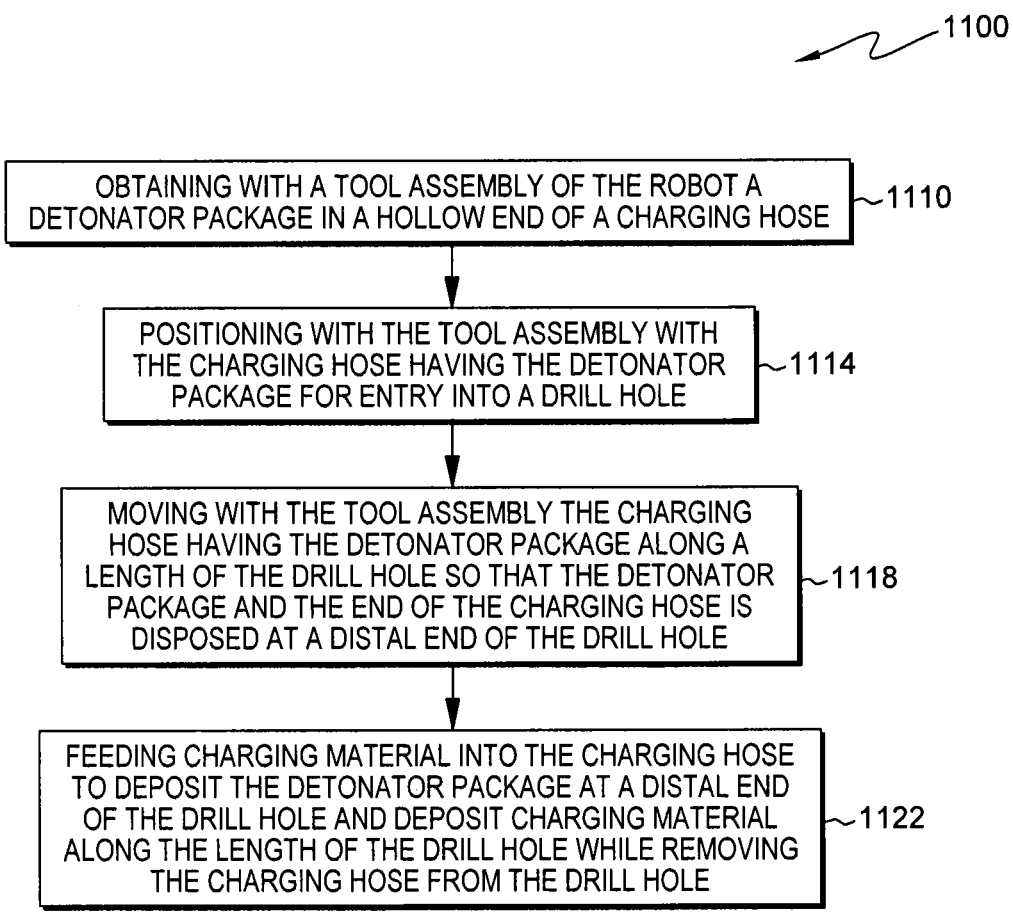
FIG. 14 is a flow diagram illustrating a method for charging in one embodiment.

Referring to the flowchart of FIG. 14 and mining environment 500 of FIG. 1, one embodiment of the present disclosure includes a method 1000 for charging a plurality of drill holes 18 in mining wall 16.

The method can also include at block 1110 (and with reference to FIG. 9), obtaining with tool assembly 102T of robot 102 detonator package 510 in a hollow end of charging hose 202. The method can also include at block 1114 (and with reference to FIG. 10), positioning with tool assembly 102T charging hose 202 having the detonator package 510 for entry of charging hose 202 having detonator package 510 into drill hole 18 (e.g., for drill hole entry), e.g. at a position adjacent to an opening 218 of drill hole 18. The method can also include at block 1118 (and with reference to FIGS. 11A and 11B) moving with tool assembly 102T charging hose 202 along a length of drill hole 18 so that detonator package 510 and the end of charging hose 202 is disposed at a distal end 318 (FIGS. 11A and 11B) of drill hole 18. The method can also include at block 1122 (and with reference to FIGS. 11A and 11B) feeding explosive material 226 (FIG. 12) into charging hose 202 (in the direction of arrow 222, 11A and 11B) to deposit detonator package 510 at the end of drill hole 18 and deposit explosive material 226 (11A and 11B) along the length of drill hole 18 while removing charging hose 202 (in a backward direction as indicated by arrow 231, 11A and 11B) from drill hole 18. Other embodiments may include corresponding computer systems, apparatus, and computer programs recorded on one or more computer storage devices, each configured to perform the actions of the methods.

With reference again to FIG. 1, system 100 can perform the positioning with tool assembly 102T of charging hose 202 at block 1114 based on a processing of one or more image representation obtained with camera system 104. In one embodiment, an obtaining of the one or more image representation at block 1114 (FIG. 14) can include performing one or more of a prescan, a scan, or a visual servoing. During performance of a prescan, robot 102 with camera system 104 can obtain one or more prescan image representation. For example, system 100 can process one or more prescan image representation such as low resolution one or more prescan image representation obtained during a prescan (e.g., by rotating tool assembly about a generally fixed location to image mining wall 16). The prescan may be used to determine a scan path S (FIG. 3) which can facilitate robot 102 avoiding collision with obstacles in mining environment 500 such as floor 22, ceiling 23, sidewalls 24 (FIG. 3), and mining wall 16. During performance of a scan, system 100 can control robot 102 with camera system 104 to move along scan path S to allow system 100 to obtain with camera system 104 one or more scan image representation of mining wall 16 such as one or more high resolution scan image representation, which may be obtained while avoiding collision with the mining environment.

In one embodiment, a prescan image representation can have lower resolution than a subsequent scan image representation. In one embodiment, the prescan image representation can be obtained with camera system 104 being positioned at a further distance from mining wall 16 than the position of camera system 104 relative to mining wall 16 for obtaining the scan image representation. A subsequently obtained scan image representation, in one embodiment, can include image data more fully representing an opening 218 of and/or an interior of drill hole 18 than a prescan image representation. For performing a scan, robot 102 can move camera system 104 to various positions proximate to an opening 218 of drill hole 18 in a manner that detailed 3D point cloud image data representing an opening 218 and/or an interior of drill hole 18 can be obtained, e.g., so that an orientation and/or a depth of drill hole 18 may be determined.

During performance of visual servoing as described in greater detail herein, robot 102 with tool assembly 102T including camera system 104 can position one or more charging component for insertion into drill hole 18 based on currently obtained visual servoing one or more image representation or based on prior obtained scan image representation. The current one or more image representation can be a contemporaneously obtained one or more image representation contemporaneously obtained by system 100. During performance of visual servoing, system 100 can switch from obtaining three dimensional image representations to obtaining two dimensional image representations for faster image processing.

In one embodiment, with reference to the flow diagram of FIG. 14 obtaining at block 1110 can be performed after performing of a pre-scan and a scan and prior to performing of visual servoing (system 100 can perform visual servoing with charging hose 202 being held by tool assembly 102T in one embodiment).

With reference again to FIG. 1, implementations of the present disclosure may include one or more of the following features. The method where the obtaining with tool assembly 102T attached to the robotic arm detonator package 510 in the hollow end of charging hose 202 from a magazine supporting a plurality of detonator packages 510 may include coordinating tool assembly 102T to magazine 15 supporting plurality of detonator packages 510. The method may further include magazine 15 operative for assembling a plurality of primers 512 onto a plurality of detonators 514 (FIG. 8). A signal wire 516 (FIG. 8) may be attached to each primer 512 (FIG. 8). The method may include moving charging hose 202 where tool assembly 102T is operative to rotate charging hose 202 back and forth around longitudinal axis 204 of charging hose 202 to overcome an obstruction of feeding charging hose 202 in drill hole 18 (such as may be imposed e.g., by obstruction 235 of drill hole 18 shown in FIGS. 21 and 22). The method may include using a camera system 104 which can include a 3D camera system. The method where the processing is based on a drilling map 116 which can have recorded therein location and other information regarding a plurality of drill holes 18. The method where the processing is performed off site from the obtaining the representation of the mining wall having the plurality of drill holes 18. The method where obtaining the one or more image representation includes merging together image data from a plurality of image representations representing the plurality of portions of mining wall 16. Implementations of the described techniques may include hardware, a method or process, or computer software on a computer-accessible medium.

System 100 can have an automated mode of operation in which the robot 102 with tool assembly 102T automatically performs a charging component positioning procedure for controlling a position of one or more charging component, e.g., charging hose 202. System 100 can have a teleoperation mode of operation in which the robot with tool assembly 102T performs the charging component positioning procedure for controlling the position of the one or more charging component based on one or more operator input.

Figure 15:
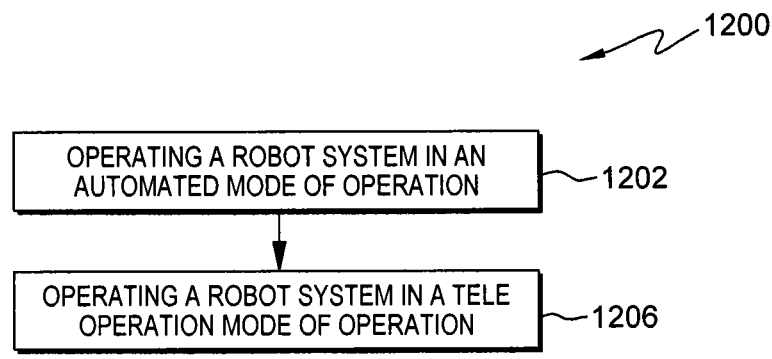
FIG. 15 is a flow diagram illustrating a method for charging in one embodiment.
Figure 16:
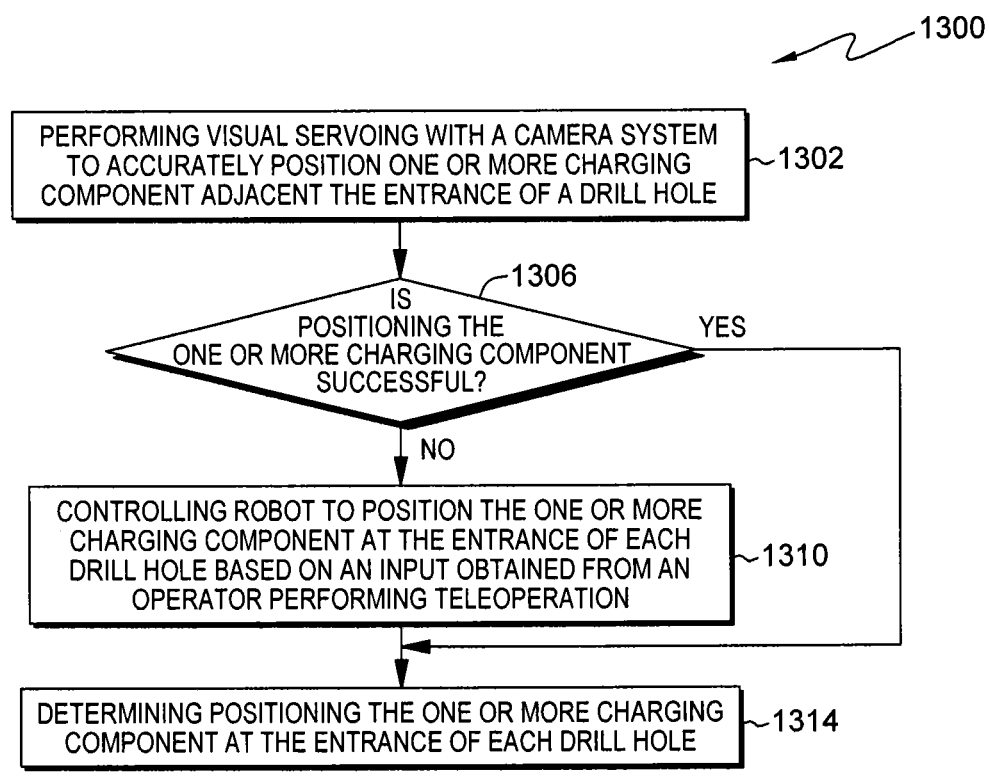
FIG. 16 is a flow diagram illustrating a method for positioning in one embodiment.
Figure 17:
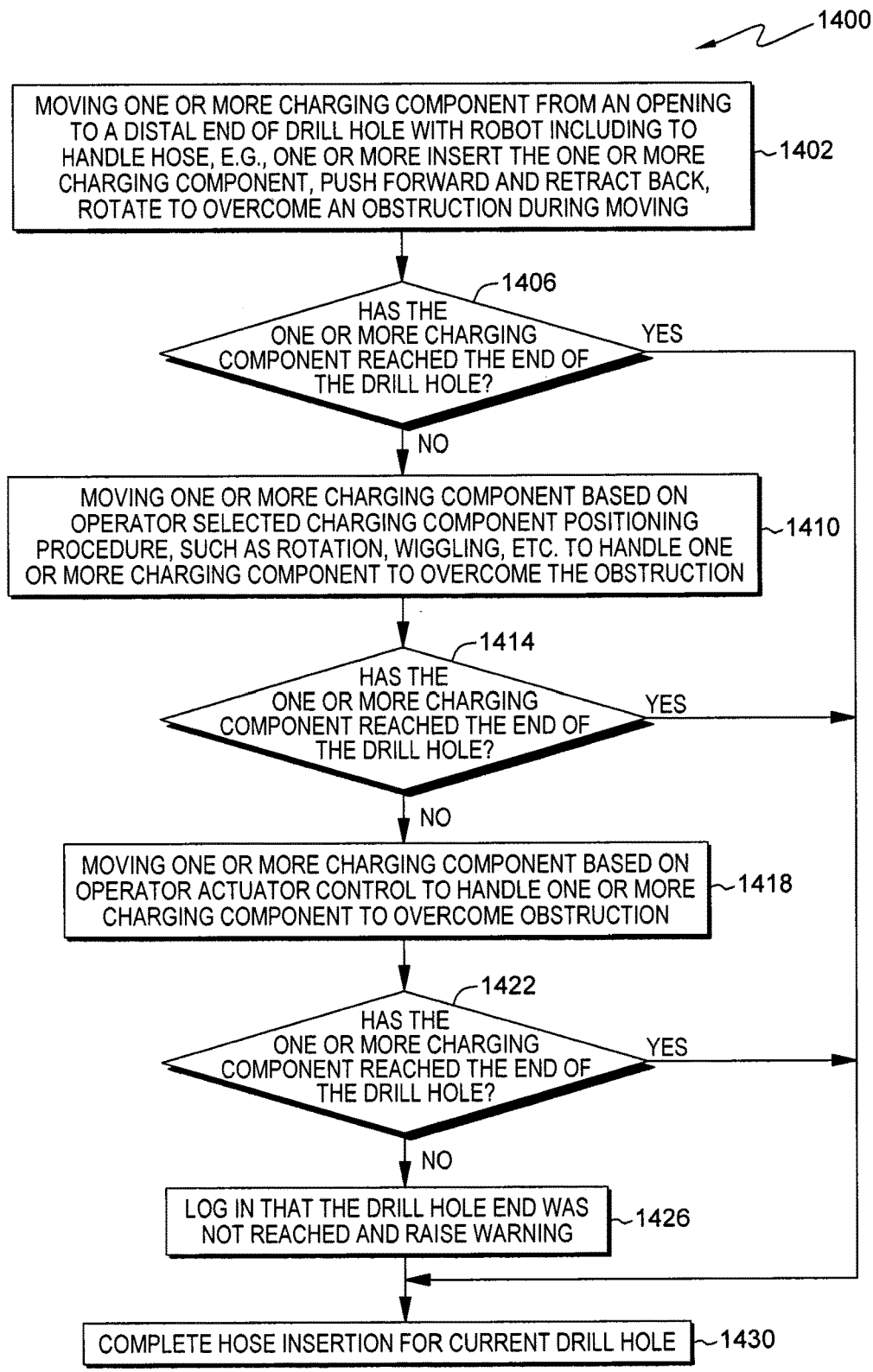
FIG. 17 is a flow diagram illustrating a method for registering in one embodiment.

With reference to the flow diagrams of FIGS. 15-17 there is set forth herein a system 100 comprising a robot 102 having a tool assembly 102T, wherein system 100 is configured to operate in an automated mode of operation in which robot 102 with tool assembly 102T automatically performs a charging component positioning procedure for controlling a position of one or more charging component; and wherein system 100 is configured to operate in a teleoperation mode of operation in which the robot with the tool assembly performs the charging component positioning procedure for controlling the position of the one or more charging component based on one or more operator input. In one embodiment, system 100 can be configured to transition from the automated mode of operation to the teleoperation mode of operation in response to a sensed condition being sensed. In one embodiment, system 100 can be configured to transition from the automated mode of operation to the teleoperation mode of operation in accordance with a manual override feature based on one or more operator input.

One or more computer system of system 100, e.g., one or more computer system of robot 102, robot controller 150, operator computer system 170 or backend computer system 160 can be configured to perform particular operations or actions by virtue of having software, firmware, hardware, or a combination of them installed on the one or more computer that in operation causes or cause the one or more computer to perform the actions. One or more computer program can be configured to perform particular operations or actions by virtue of including instructions that, when executed by data processing apparatus, cause the apparatus to perform the actions. Referring to the flow diagram of FIG. 15, one general aspect can include a method 1300 for positioning a charging component, e.g. one or more charging component.

Referring to the flow diagram of FIG. 15, e.g., implemented by one or more system 100 in mining environment 500 of FIG. 1, method 1200 can include at block 1202 operating a system 100 in an automated mode of operation and at block 1206 operating a system 100 in a teleoperation mode of operation. At block 1202 operating a system 100 in an automated mode of operation can be a mode of operation in which robot 102 with the tool assembly 102T automatically performs a charging component positioning procedure for controlling a position of one or more charging component. At block 1206 operating a system 100 in a teleoperation mode of operation can be mode of operation in which robot 102 in one embodiment with the tool assembly 102T performs the charging component positioning procedure for controlling the positioning of the one or more charging component based on one or more operator input. An automated mode and/or a teleoperation mode can include actions other than charging component positioning. For example as explained in reference to FIG. 13 selection of next drill hole 18 can be performed either in an automated mode of operation of a teleoperation mode of operation.

In one embodiment the one or more charging component can be one or more of a charging hose 202, detonator package 510, a primer 512, a detonator 514, a signal wire 516, or explosive material 226. In one embodiment, for a time that the automated mode of operation is active the robot 102 with the tool assembly 102T performs the charging component positioning procedure independent of any current operator input.

In one embodiment, the charging component positioning procedure is a positioning procedure for positioning one or more charging component for entry into a drill hole 18. In one embodiment, the charging component positioning procedure is a positioning procedure for moving one or more charging component from an opening 218 of a drill hole 18 through to a distal end of the drill hole 18 inclusive of any obstruction avoidance charging component positioning routine performed for moving the one or more charging component from an opening 218 of a drill hole 18 through to a distal end of the drill hole 18. In one embodiment, the charging component positioning procedure is a positioning procedure for avoiding an obstruction within a drill hole 18. In one embodiment, the tool assembly 102T includes a camera system 104, and system 100 deactivates the automated mode of operation based on one or more image representation obtained with the camera system 104.

In one embodiment, system 100 is configured for operation in an automated operating mode to perform a charging component positioning procedure to position one or more charging component for entry into a drill hole 18, and system 100 is configured to transition from the automated mode of operation to the teleoperation mode of operation in response to a sensed condition being sensed, the sensed condition being the condition that the one or more charging component is not positioned properly for drill hole entry into a drill hole 18, the sensed condition being determined by processing of one or more image representation obtained with the camera system 104.

In one embodiment, the system 100 is configured for operation in an automated operating mode to perform a charging component positioning procedure for moving one or more charging component from an opening 218 of a drill hole 18 to a distal end 318 of a drill hole 18 inclusive of any obstruction avoidance charging component positioning routine and system 100 is configured to transition from the automated mode of operation to the teleoperation mode of operation in response to a sensed condition being sensed, the sensed condition being the condition that the one or more charging component has not reached a distal end 318 of the drill hole 18.

In one embodiment, the system 100 in the teleoperation mode activates in response to one or more user input an obstruction avoidance charging component positioning procedure selected from a group comprising (a) pushing in (b) retracting (c) rotating and (d) wiggling.

In one embodiment, the system 100 with tool assembly 102T in the teleoperation mode provides motion to a charging component that corresponds to motion that is imparted by an operator to an actuator of an operator computer system. In one embodiment, the one or more operator input is an input of a supervisor operator entered into a user interface of a remote operator computer system located remoted from the robot 102.

In one embodiment, system 100 can have a manual override feature and can be configured so that system 100 transitions from an automated mode to a teleoperation mode based on an input of an operator entered using a user interface of operator computer system 170. Thus, system 100 operating in an automated mode of operation to perform a component positioning procedure for positioning one or more charging component for entry into a drill hole 18 can transition to a teleoperation mode of operation for positioning one or more charging component for entry into a drill hole 18 based on an input of an operator entered using a user interface of operator computer system 170 to activate a manual override of the automated operating mode. System 100 operating in an automated mode of operation for moving one or more charging component from an opening 218 of a drill hole 18 to a distal end 318 of drill hole 18 (inclusive of any obstruction avoidance component positioning routine) can transition to a teleoperation mode of operation for moving one or more charging component from an opening 218 of a drill hole 18 to a distal end 318 of drill hole based on an input of an operator entered using a user interface of operator computer system 170 to activate a manual override of the automated operating mode.

As has been noted operator computer system 170, in one embodiment, can include local operator computer system and supervisor operator computer system and be distributed in both local and remote locations to permit operation by both one or more operator at a local location and one or more operator at a remote location. In one embodiment, system 100 can be configured so that the remote supervisor operator computer system has priority over the local operator computer system. In one embodiment, system 100 can be configured so that system 100 disables a local operator computer system based on one or more operator input entered into a user interface of a remote supervisor operator computer system of operator computer system 170.

The flow diagram of FIG. 15 illustrates general features of a charging method in one embodiment wherein a system 100 can transition between an automated mode of operation and a teleoperation mode of operation. Flow diagrams of FIGS. 16 and 17 illustrate specific examples of charging methods that can be performed in the performance of the general method generally described with reference to the flow diagram of FIG. 12 wherein a system 100 can transition between an automated mode of operation and a teleoperation mode of operation. Specific embodiments of a system 100 operating in an automated mode of operation and a teleoperation mode of operation are set forth in reference to FIGS. 16-17.

In one embodiment, as illustrated with reference to FIG. 16 the component positioning procedure can include a procedure for positioning one or more charging component for entry into a drill hole 18 (FIG. 10).

One or more computer system of system 100, e.g., one or more computer system of robot 102, robot controller 150, operator computer system 170 or backend computer system 160 can be configured to perform particular operations or actions by virtue of having software, firmware, hardware, or a combination of them installed on the one or more computer that in operation causes or cause the one or more computer to perform the actions. One or more computer program can be configured to perform particular operations or actions by virtue of including instructions that, when executed by data processing apparatus, cause the apparatus to perform the actions. Referring to the flow diagram of FIG. 16, one general aspect can include a method 1300 for positioning one or more charging component.

Referring to the flow diagram of FIG. 16, e.g., implemented by one or more system 100 in mining environment 500 of FIG. 1, method 1300 can include at block 1302 performing visual servoing with camera system 104 to position one or more charging component held by tool assembly 102T for drill hole entry e.g. at a position adjacent to an entrance of a drill hole 18. In performing visual servoing, system 100 can control a position of robot 102 for insertion of one or more charging component into drill hole 18 based on current image data of the system, e.g., image data of one or more image representation contemporaneously obtained using camera system 104. A charging component can be e.g. one or more of charging hose 202 a detonator package 510 a component of a detonator package 510 or explosive material 226. A method can include at block 1306, system 100 determining whether a positioning of the one or more charging component resulting from performing visual servoing is successful. For example, system 100 can determine if the obtained image data obtained during visual servoing satisfies predetermined criteria for the image data representing a drill hole 18. Image data representing other than a drill hole 18 can indicate that a robot is misaligned with respect to a drill hole 18 indicating a possible error in positioning of one or more charging component for entry into drill hole 18. In one embodiment functions described with reference to block 1302 can be performed with system 100 operating in an automated mode of operation as set forth herein.

A method can include at block 1310, on determination at block 1306 that a positioning is not successful, controlling robot 102 to position the one or more charging component held by robot 102 based on one or more input obtained from an operator. Thus, in one embodiment functions described with reference to block 1310 as set forth in the flow diagram of FIG. 16 can be performed with system 100 operating in a teleoperation mode of operation as set forth herein. At block 1310 in one embodiment system 100 can transition from an automated mode of operation to a teleoperation mode of operation. An operator can teleoperate the robot 102 to position the one or more charging component, e.g., one or more of charging hose 202, detonator package 510, one or more component of detonator package 510 or explosive material 226 for entry into drill hole 18, e.g., by positioning the one or more charging component at the entrance of a drill hole 18. Referring to FIG. 20 operator computer system 170 can include a user interface. A physical form view of an operator computer system 170 can include a display 1702 in combination with an actuator provided by a haptic motion controller 1706 (FIG. 20). A Haptic motion controller can provide tactile feedback to an operator. Haptic motion controller 1706 (FIG. 20) can be a PHANTOM OMNI® motion controller available from Sensable Technologies. In one embodiment, system 100 can be operative so that tool assembly 102T provides motion to one or more charging component that corresponds to motion that is imparted to motion imparted by an operator to haptic motion controller 1706 (FIG. 20). For example, in one embodiment, imparting a force to member 1708 of haptic motion controller 1706 along axis 704 of member 1708 in a direction of arrows 706 can result in movement of one or more charging component in a corresponding direction indicated by arrows 206 (FIG. 1, FIGS. 6-7) along axis 204 (FIG. 1, FIGS. 6-7). Imparting a force to member 1708 of haptic motion controller 1706 rotationally about axis 704 of member 1708 in a direction of arrows 708 can result in movement of one or more charging component in a corresponding rotational direction indicated by arrows 208 (FIG. 1, FIGS. 6-7) about axis 204 (FIG. 1, FIGS. 6-7). Operator computer system 170 having a user interface can be located in an underground area 12 and/or external to underground area 12. An operator can input robot position control data using haptic motion controller 1706 on observing current image data obtained from camera system 104 which current image data can be displayed on display 1702. System 100 can control a position of robot 102 holding one or more charging component based on one or more control input obtained from an operator and entered by an operator into a user interface of operator computer system 170.

With reference again to FIG. 16, a method can include at block 1314 system 100 determining that positioning is complete by confirming that the one or more charging component is positioned for entry into a drill hole 18. Such determining can include e.g. system 100 performing pattern recognition processing using one or more image representation obtained with use of camera system 104 to confirm that a drill hole 10 is aligned to one or more charging component. On the confirmation the one or more charging component has been positioned for drill hole entry system 100 can be operative to proceed to move one or more charging component within a drill hole 18 in accordance with, for example, a charging component positioning procedure for positioning one or more charging component within a drill hole 18 e.g. from an opening 218 of a drill hole 18 to a distal end 318 of a drill hole 18.

As noted above, the robot charging system can be teleoperated (locally or remotely) if visual servoing guidance which can be performed in an automated operating mode cannot successfully position a charging component e.g., charging hose 202 relative to drill hole 18. Such a technique may improve the robustness and reliably of system 100, for example, even if there is error in the automatic drill hole detection and positioning, system 100 may still complete the positioning of a charging component with operator's guidance.

System 100 can have an automated mode of operation in which the robot 102 with tool assembly 102T automatically performs a charging component positioning procedure for controlling a positioning of one or more charging component e.g. charging hose 202. System 100 can have a teleoperation mode of operation in which the robot 102 with tool assembly 102T performs the charging component positioning procedure for controlling the positioning of the one or more charging component based on one or more operator input. In one embodiment, as set forth with reference to the flow diagram of FIG. 16, the component positioning procedure can be a procedure for positioning one or more charging component, e.g. charging hose 202, a detonator package 510, one or more component of detonator package 510, or explosive material 226 for drill hole entry (FIG. 10).

In the embodiment described with reference to the flow diagram of FIG. 16, system 100 is configured to operate in each of an automated mode of operation and a teleoperation operating mode of operation and can transition from an automated mode of operation to a teleoperation mode of operation based on a sensed condition that can be sensed at block 1306. The sensed condition can be e.g. the determination that a positioning has been unsuccessful and can be based on a result of a processing of one or more image representation obtained with camera system 104 during performance of visual servoing. In one embodiment, system 100 can have a manual override feature and can be configured so that system 100 transitions from an automated mode to a teleoperation mode based on an input of an operator entered using a user interface of operator computer system 170.

One or more computer system of system 100, e.g., one or more computer system of robot 102, robot controller 150, operator computer system 170 or backend computer system 160 can be configured to perform particular operations or actions by virtue of having software, firmware, hardware, or a combination of them installed on the one or more computer that in operation causes or cause the one or more computer to perform the actions. One or more computer program can be configured to perform particular operations or actions by virtue of including instructions that, when executed by data processing apparatus, cause the apparatus to perform the actions. Referring to the flow diagram of FIG. 17, one general aspect can include a method 1400 for moving one or more charging component within a drill hole 18.

In reference to method 1400 illustrated in reference to the flow diagram of FIG. 17 along with FIG. 1, method 1400 can include at block 1402 system 100 performing a charging component positioning procedure for moving one or more charging component from an opening 218 of drill hole 18 to a distal end 318 of a drill hole 18. For performance of a charging component positioning procedure as set forth in reference to block 1402 a tool assembly 102T can be operated to move one or more charging component (e.g. one or more of a charging hose, a detonator package 510, one or more component of a detonator package 510, explosive material 226) within a drill hole 18 for performance of component positioning procedure, e.g., to one or more of push forward charging hose 202 held by tool assembly 102T, retract charging hose 202 or rotate charging hose 202 to overcome an obstruction 235 (FIGS. 11A and 11B) during movement of a charging hose 202 within drill hole 18 from opening 218 to distal end 318 of drill hole 18. Referring to FIGS. 11A and 11B the one or more component can include in one embodiment a charging hose 202 held by tool assembly 102T and a detonator package 510 held by charging hose 202. System 100 can be operating in an automated mode of operation during performance of block 1402 in a manner that selection of one or more obstruction avoidance routine is automatic, e.g. one or more different routines can be automatically performed in e.g. a random sequence, a predetermined sequence or a sequence based on one or more sensed condition, a sensed motion resistance or torque sensed by tool assembly 102T using one or more sensor of sensors/sensing devices 108 during performance of an obstruction avoidance routine. A method can include at block 1406 system 100 determining whether a one or more charging component has reached a distal end 318 of a drill hole 18. If yes system 100 can proceed to block 1430 and drill hole movement for a current drill hole 18 can be determined to be complete. If no, system 100 can proceed to block 1410. For determining at block 1406 whether movement of one or more charging component within a drill hole 18 is complete in one embodiment system 100 can compare a detected position of charging hose 202 based on a length of charging hose 202 offset from robot 102 to a recorded depth of a drill hole 18 recorded in drilling map 116. A recorded depth of a drill hole 18 indicative of distal end 318 in one embodiment can be a design parameter designed in by a blast engineer. For determining whether movement of one or more charging component within a drill hole 18 is complete in one embodiment system 100 can compare a detected position of one or more charging component based on a length of charging hose 202 offset from robot 102 to one or more image representation of a drill hole 18 that can include 3D point cloud data that indicated a depth of drill hole 18. System 100 can be operative to determine a distance of charging hose 202 offset from robot 102 when it is inserted based on data available from one or more moving mechanism of tool assembly 102T that indicates a length of charging hose 202 currently extending from an end of tool assembly 102T.

A method 1400 can include at block 1410 system 100 performing an obstruction avoidance charging component positioning procedure based on one or more input obtained from an operator. Operator computer system 170 can include a user interface having a display 1702 displaying a user interface display screen as shown in FIG. 22. Using a user interface of operator computer system 170 an operator can select, e.g., by pointing and clicking with pointer 1718 an obstruction avoidance charging component positioning procedure such as (a) push (b) retract (c) rotate (d) wiggle (rotate back and forth) to handle one or more charging component e.g. including charging hose 202 to overcome the obstruction. A one or more obstruction avoidance component positioning procedure that can be performed at block 1410 can be similar to a one or more obstruction avoidance routine that can be performed at block 1402 except that whereas obstruction avoidance routines performed at block 1402 can be automatically selected for activation by system 100, obstruction avoidance component positioning procedures performed at block 1410 can be selected based on one or user input of an operator.

A method 1400 as set forth in the flow diagram of FIG. 17 can include at block 1414 system 100 determining again whether one or more charging component e.g. including charging hose 202 has reached an end of a drill hole 18. If yes system 100 can proceed to block 1430 and charging component moving for a current drill hole can be determined to be complete. If no at block 1410 an operator can teleoperate robot 102 to handle one or more charging component e.g. including charging hose 202 to overcome the obstruction. A method can include at block 1410 system 100 performing with robot 102 charging component positioning based on specific actuator control inputs of an operator so that motion of one or more charging component corresponds to motion imparted to an actuator by an operator. Operator computer system 170 can include a user interface having a display 1702 a physical form view of which is shown in FIG. 20. Using a user interface of operator computer system 170 an operator can move one or more charging component e.g. including charging hose 202 in a manner specified by the operator using e.g., haptic motion controller 1706 shown in FIG. 20. System 100 can be operative to control motion of one or more charging component, e.g. one or more of charging hose 202, primer 512, detonator 514 or signal wire 516 so that motion of the one or more charging component corresponds to motion imparted to a user interface actuator of an operator computer system 170. For example, system 100 can be operative so that if an operator moves member 1708 of haptic motion controller 1706 axially in a direction of arrows 706 along axis 704 of member 1708, system 100 moves the charging component along its axis, e.g. longitudinal axis 204 (FIG. 1, FIG. 6, FIG. 7). In one particular embodiment, system 100 can be operative so that one or more charging component e.g. including charging hose 202 is moved by tool assembly 102T in or out axially along longitudinal axis 204 (FIG. 1) a distance proportional to a distance that operator moves member 1708 of haptic motion controller 1706 in or out in a direction indicated by arrows 706. System 100 can be operative so that if an operator moves member 1708 of haptic motion controller 1706 rotationally about its axis 704 in a direction of arrows 708, system 100 moves the one or more charging component rotationally about its axis, e.g. longitudinal axis 204 (FIG. 1, FIG. 6, FIG. 7). In one particular embodiment, system 100 can be adapted so that one or more charging component e.g. including charging hose 202 is rotated by tool assembly 102T back or forth about longitudinal axis 204 in a direction of arrows 208 (FIG. 1, FIG. 6, FIG. 7) an amount proportional to an amount that operator rotates member 1708 of haptic motion controller 1706 back or forth rotationally in a direction indicated by arrows 708 (FIG. 20). At block 1422 system 100 can again determine whether a one or more charging component e.g. including charging hose 202 has reached a distal end 318 of drill hole 18. If yes system 100 can proceed to block 1430 and charging component movement for a current drill hole 18 can be determined to be complete. If not system 100 can log in e.g., to drilling map 116 that a distal end 318 of drill hole 18 has not been reached and a warning can be raised at block 1526.

System 100 as illustrated in the flow diagram of FIG. 17 can have an automated mode of operation in which the robot 102 with tool assembly 102T automatically performs a charging component positioning procedure for controlling a positioning of one or more charging component e.g. charging hose 202, detonator package 510, one or more component of detonator package 510 or explosive material 226. System 100 as illustrated in the flow diagram of FIG. 17 can have a teleoperation mode of operation in which the robot 102 with tool assembly 102T performs the charging component positioning procedure for controlling the position of the one or more charging component based on one or more current operator input. In one embodiment, as set forth with reference to the flow diagram of FIG. 17, blocks 1402, 1406, 1410, 1414, and 1418, the component positioning procedure can be a procedure for moving one or more charging component from an opening 218 of a drill hole 18 to a distal end 318 of drill hole 18.

In the embodiment described with reference to the flow diagram of FIG. 17, blocks 1402, 1406, 1410, 1414, and 1418 system 100 is configured to operate in each of an automated mode of operation (block 1402 and block 1410) and a teleoperation operating mode of operation (block 1410 and block 1418) and can transition from an automated mode of operation to a teleoperation mode of operation based on a sensed condition that can be sensed at block 1406. The sensed condition can be, e.g., the determination at block 1406 that one or more charging component has not reached a distal end 318 of drill hole 18. In one embodiment, system 100 can have a manual override feature and can be configured so that system 100 transitions from an automated mode to a teleoperation mode based on one or more input of an operator entered using a user interface of operator computer system 170.

As set forth herein system 100 can have an automated mode of operation in which the robot 102 with tool assembly 102T automatically performs a charging component positioning procedure for controlling a position of one or more of charging component e.g. charging hose 202, detonator package 510, one or more component of detonator package 510, or explosive material 226. System 100 can have a teleoperation mode of operation in which the robot 102 with tool assembly 102T performs the charging component positioning procedure for controlling the position of the one or more charging component based on one or more operator input. In one embodiment, as set forth with reference to the flow diagram of FIG. 17, blocks 1410, 1414, and 1418, the charging component positioning procedure can be an obstruction avoidance charging component positioning procedure for moving one or more charging component to avoid an obstruction within a drill hole 18.

In the embodiment described with reference to the flow diagram of FIG. 17, blocks 1410, 1414, and 1418, system 100 is configured to operate in each of an automated mode of operation (block 1410) and a teleoperation operating mode of operation (block 410 and block 1418) and can transition from an automated mode of operation to a teleoperation mode of operation based on a sensed condition that can be sensed at block 1414 (an obstruction avoidance component positioning procedure can be selected during operation of system 100 in a teleoperation mode of operation at block 1410 and when the obstruction avoidance component positioning procedure is active system 100 can be regarded to be operating in an automated operating mode of operation). The sensed condition at block 1414 can be e.g., the determination that one or more charging component has not reached a distal end 318 of a drill hole 18. The sensed condition at block 1414 can in addition or alternatively be e.g. a sensed motion resistance or torque sensed by tool assembly 102T using one or more sensor of sensors/sensing devices 108 during performance of an obstruction avoidance component positioning procedure. In one embodiment, system 100 can have a manual override feature and can be configured so that system 100 transitions from an automated mode to a teleoperation mode based on one or more input of an operator entered using a user interface of operator computer system 170.

Referring overall to the flow diagram of FIG. 17, if a distal end 318 of drill hole 18 cannot be reached (determined at block 1406 e.g. based the depth information of drill hole 18 which can be recorded in drilling map 116 as set forth herein) with system 100 operating in in an automated mode of operation (block 1402) system 100 can transition to a teleoperation mode of operation (1410) to permit selection of an obstruction avoidance charging component positioning procedure. With the selected charging component positioning procedure active (block 1410) system 100 can be regarded to be operating in an automated mode of operation. If a drill hole distal end 318 still cannot be reached (block 1414) or an alternate condition sensed (e.g. motion resistance, torque as set forth herein), system 100 can transition again to a teleoperation mode of operation and proceed to block 1418. At block system 100 can perform actuator corresponding motion control so that motion of one or more charging component corresponds to motion imparted to a user interface actuator as set forth herein. If a drill hole distal end 318 still cannot be reached (block 1422) the system 100 can log in the missed drill hole 18 into drilling map 116 and raise a warning.

The method of FIG. 17 illustrates the flexibility and robustness of the system 100 for robot charging with teleoperation and robot programming. It also provides the quality control and monitoring the charging process. The information obtained by system 100 can be available to an operator (e.g. local operator and/or supervisor operator) in real time on an ongoing basis as the information is obtained.

It will be recognized in connection with the flow diagrams of FIGS. 15-17 that if system 100 transitions from an automated mode of operation to a teleoperation mode of operation during performance of a charging component positioning procedure, the procedure being performed (e.g. positioning one or more charging component for entry into a drill hole 18, moving one or more charging component from an opening 218 to a distal end 318, positioning one or more charging component for avoiding an obstruction within a drill hole 18) at the time of the transition need not necessarily be completed by system 100 and if it is completed may be completed with the system 100 operating in a teleoperation mode of operation and not the automated mode of operation.

One or more computer system of system 100, e.g., one or more computer system of robot 102, robot controller 150, operator computer system 170 or backend computer system 160 can be configured to perform particular operations or actions by virtue of having software, firmware, hardware, or a combination of them installed on the one or more computer that in operation causes or cause the one or more computer to perform the actions. One or more computer program can be configured to perform particular operations or actions by virtue of including instructions that, when executed by data processing apparatus, cause the apparatus to perform the actions. Referring to the flow diagram of FIG. 18, one general aspect can include a method 1500 for registering a detected drill hole 18 detected within 3D point cloud image data with drilling map 116.

Figure 18:
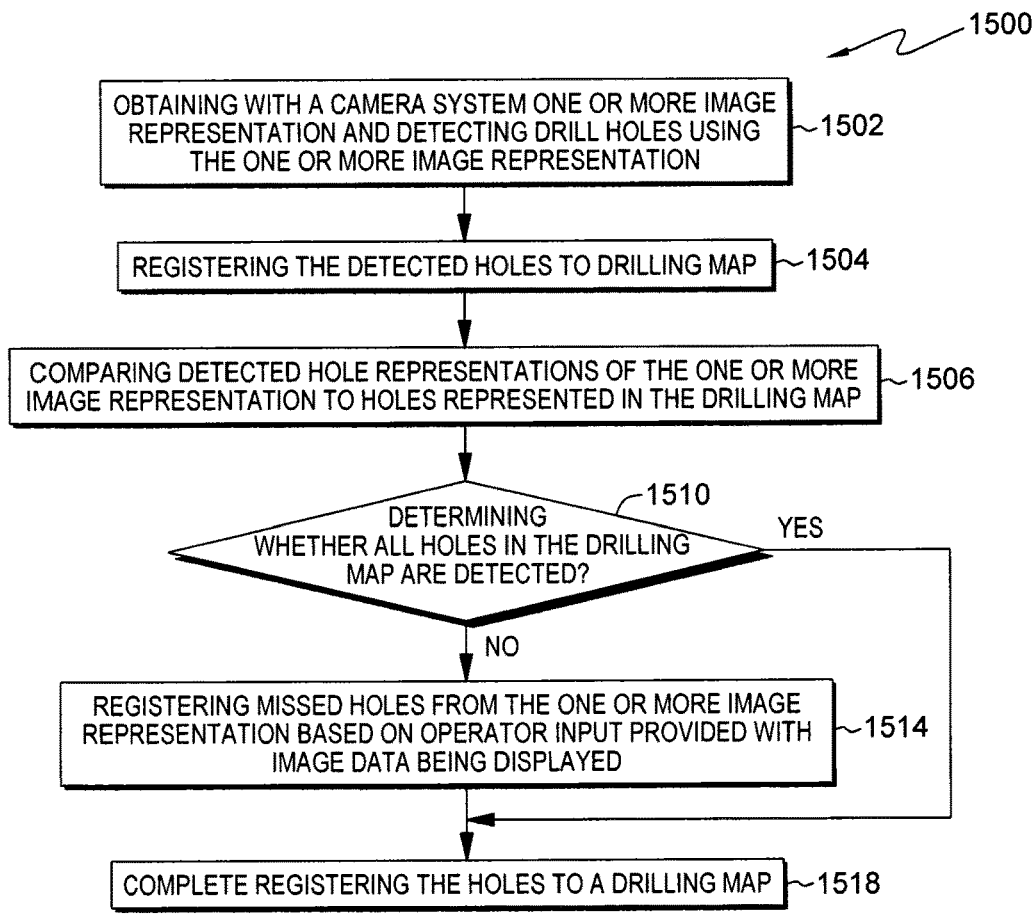
FIG. 18 is a flow diagram illustrating a method for charging in one embodiment.

Referring to the flow diagram of FIG. 18, e.g., implemented by one or more system 100 in mining environment 500 of FIG. 1, method 1500 can include at block 1502 system 100 obtaining with camera system 104 an image representation of a mining wall 16 and detecting drill holes 18 in the one or more image representation. In one embodiment, the one or more image representation can be provided by one or more 3D point cloud image data representation. A method can include at block 1504 system 100 registering the detected drill holes to drilling map 116 as set forth herein. A method 1500 can include at block 1506 system 100 comparing detected drill hole representations of one or more image representation of drilling map 116. A method 1500 can include at block 1510 system 100 determining whether all drill holes 18 represented in drilling map 116 have been detected within the one or more image representation obtained at block 1502. If yes, system 100 can proceed to block 1518 where system 100 can determine that drill hole registration is complete. If not, at block 1514 an operator can select missed drill holes from one or more image representation of a mining wall 16 (e.g., using the feature described with reference to FIG. 21) and register the operator selected drill holes 18 to drilling map 116, e.g., registering missed drill holes 18 from one or more image representation based on an operator input.

Referring to FIG. 21 and system 100 of FIG. 1, operator computer system 170 can include a user interface with display 1702. System 100 can display on display image data of the one or more image representation corresponding to a missed drill hole representation of drilling map 116. System 100 can be configured to allow an operator e.g., by movement of pointer 1718 to manipulate one or more highlight 1710 of display 1702 to indicate a region of interest of displayed image data to indicate image data that should have been detected by system 100 as image data representing a drill hole 18. System 100 can be configured so that a drill hole representation of one or more image representation may be lower quality and may not be detected as a drill hole representation automatically by system 100 (e.g. because predetermined criteria for image data representing a drill hole 18 are not satisfied). Notwithstanding, where system 100 does not detect a drill hole representation as a drill hole system 100 may flag such undetected drill hole representation as a possible drill hole representation that can be detected as a drill hole representation on the entry of an operator highlight 1710. Referring to FIG. 21 displayed image data displayed on an operator computer system 170 representing a possible location of drill hole 18 can be superimposed on displayed image data representing a mining wall 16, e.g., by display of highlight 1710, and a user can click on the highlight to designate the representation as a detected drill hole 18. System 100 can be adapted so that an operator can point and click a highlight 1710 using a pointer 1718 to select the location of a drill hole 18 represented in displayed image data as displayed on display 1702. In the example of FIG. 21 an operator can control pointer 1718 to move highlight 1710 to a selected one of the possible drill hole representations 18D shown and then perform a click actuation to select the drill hole 18 represented by the representation 18D that is highlighted by highlight 1710 to permit system 100 to designate the selected drill hole 18 as a detected drill hole 18. Responsively thereto, system 100 can designate the selected drill hole 18 as a detected drill hole 18. The selected drill hole 18 selected based on one or more operator input can be registered to drilling map 116.

One or more computer system of system 100, e.g., one or more computer system of robot 102, robot controller 150, operator computer system 170 or backend computer system 160 can be configured to perform particular operations or actions by virtue of having software, firmware, hardware, or a combination of them installed on the one or more computer that in operation causes or cause the one or more computer to perform the actions. One or more computer program can be configured to perform particular operations or actions by virtue of including instructions that, when executed by data processing apparatus, cause the apparatus to perform the actions. Referring to the flow diagram of FIG. 19, one general aspect can include a method 1600 for using a robot in a mining environment.

Figure 19:
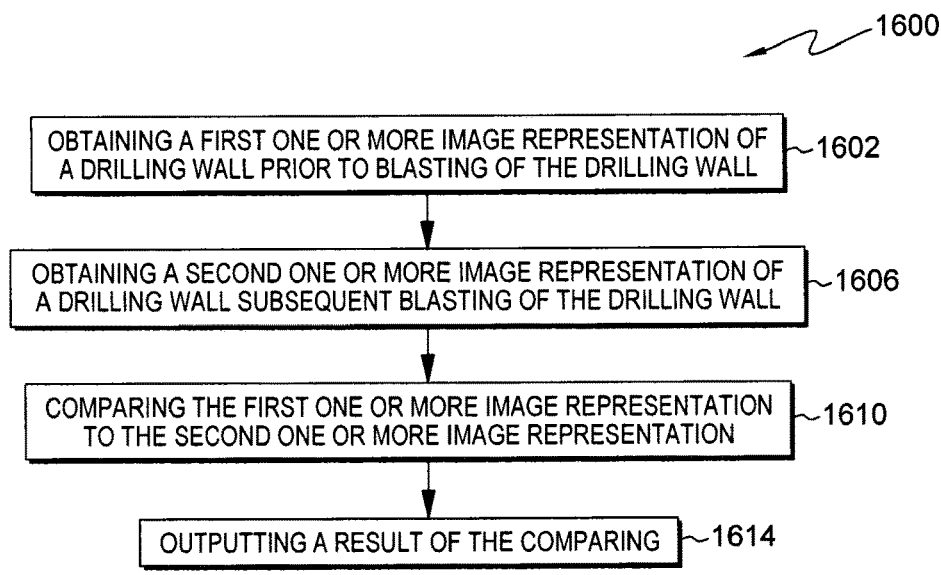
FIG. 19 is a flow diagram illustrating a method for operating a robot in a mining environment in one embodiment.

Referring to the flow diagram of FIG. 19 along with FIG. 1, method 1600 can include at block 1602 obtaining with camera system 104 one or more image representation of mining wall 16 in a state prior to blasting of the mining wall 16 using explosive material. The one or more image representation can include one or more 3D point cloud image representation. A method can include at block 1606 obtaining with camera system 104 one or more image representation of mining wall 16 in a state subsequent to blasting. The one or more image representation can include one or more 3D point cloud image representation. The obtaining of one or more image representation at block 1602 and/or block 1606 can include one or more prescan image representation as set forth herein. Carrier 14 of system 100 can place robot 102 at appropriate locations in relation to mining wall 16.

A method can include at block 1622 system 100 comparing one or more image representation obtained at block 1602 (prior to blasting) to one or more image representation obtained at block 1606 (subsequent to blasting). A method can include at block 1610 system 100 outputting information of a result of the comparing at block 1610. The information subject to outputting can be e.g., information indicating a result of the blasting. The information output can be information indicating geometric changes resulting from the blasting. One or more image representation obtained at block 1602 and block 1610 can include three dimensional information characterizing mining wall 16 (including in one embodiment associated ceiling 23 floor 22 and sidewalls 24) before and after blasting. Output information output at block 1614 can include data indicating a volume of mining wall material removed from mining wall 16 as a result of the blasting.

With reference to FIGS. 1 and 3, system 100 can monitor production by measuring the front mining wall 16 and/or associated sidewall 24 ceiling 23 or floor 22 geometric changes. After carrier 14 places robot 102 in front of mining wall 16 and once system 100 completes the scanning of the surrounding environment before and after blasting, system 100 can compare one or more image representation (e.g. which can be one or more 3D point cloud image representation of mining wall 16 which can include in one embodiment associated representations of a ceiling 23, sidewalls 24 and floor 22 as shown in FIG. 3) before the last blasting and after the last blasting to calculate the changes of mining wall 16. The mining production information obtained by system 100 can be available to operator and supervisor in real time (e.g. delay limited to data processing delay) on an ongoing basis as the information is obtained.

Figure 23:
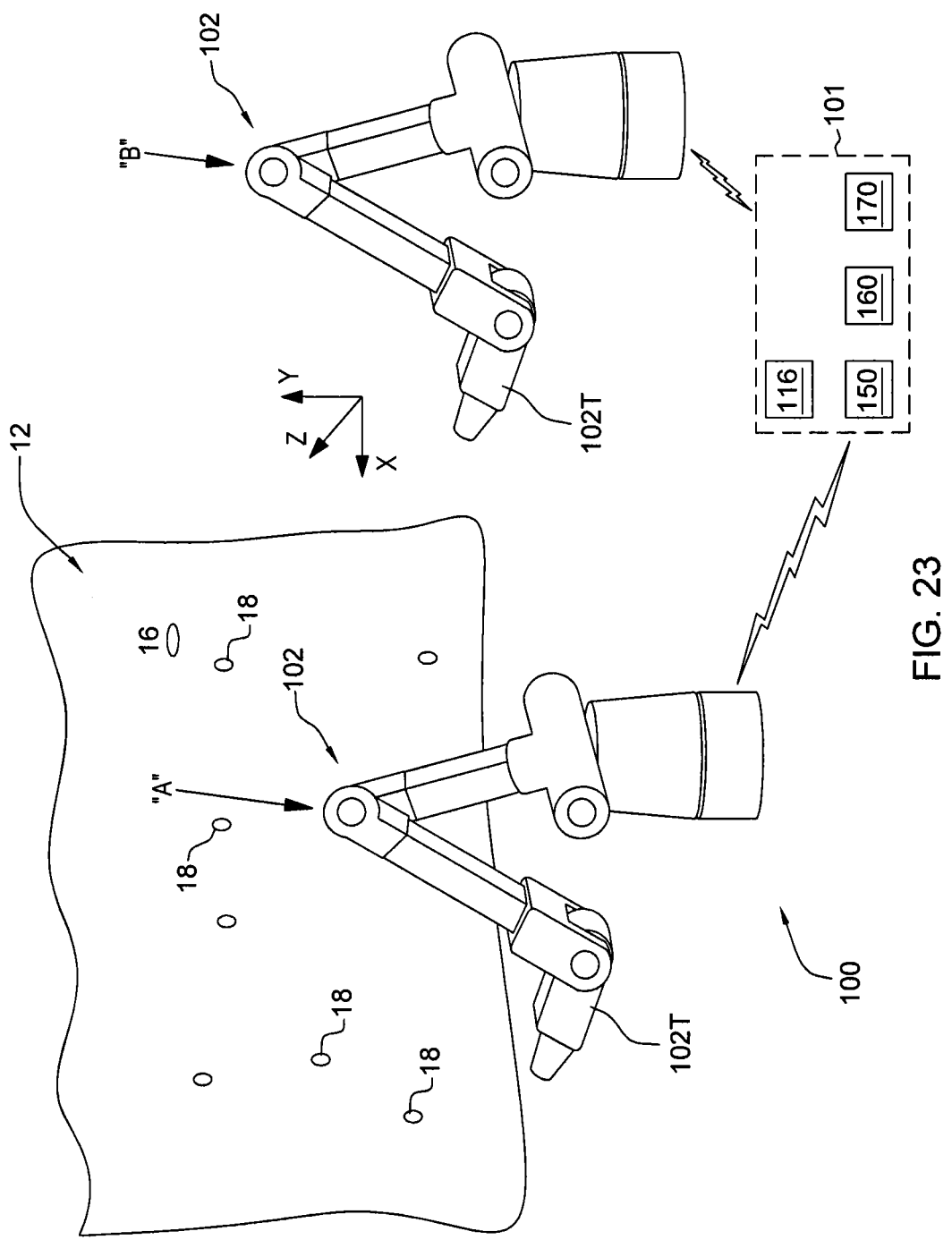
FIG. 23 is an operational perspective physical form view illustrating first and second robots working simultaneously in a mining environment in one embodiment.

In one embodiment, a method can include using more than one robot in a mining environment. FIG. 23 illustrates more than one robot working on a mining wall 16. Referring to FIG. 23 a mining environment 500 can include a first robot 102 at a first location "A" and a second robot 102 at a second location "B". System 100 can be operative so that each of the robot at location "A" and location "B" performs work simultaneously.

In one embodiment, system 100 can be operative so that each of first robot 102 at a first location "A" and second robot 102 at a second location "B" perform a common task simultaneously. In one embodiment, system 100 can be operative so that each of first robot 102 at first location "A" and second robot 102 at second location "B" performs a prescan simultaneously to obtain one or more prescan image representation of mining wall 16 simultaneously. In one embodiment, system 100 can be operative so that each of first robot 102 at first location "A" and second robot 102 at second location "B" performs a scan simultaneously to obtain one or more scan image representation of mining wall 16. In one embodiment, system 100 can be operative so that each of first robot 102 at first location "A" and second robot 102 at second location "B" performs visual servoing for positioning one or more charging component for insertion into drill hole 18 to obtain one or more visual servoing image representation. Where operative so that the first and second robots with respect to mining wall 16 simultaneously, system 100 can be operative so that the first and second robots are restricted from working within a threshold distance away from another so as to prevent collision between the first and second robots.

In one embodiment, system 100 can be operative so that first robot 102 at first location "A" and second robot 102 at second location "B" perform a different respective tasks simultaneously. In one embodiment, system 100 can be operative so that first robot 102 at first location "A" performs a prescan simultaneously to obtain one or more prescan image representation of mining wall 16 simultaneously while second robot 102 at second location "B" performs a scan to obtain one or more scan image representation of mining wall 16. In one embodiment, system 100 can be operative so that first robot 102 at first location "A" performs a prescan simultaneously to obtain one or more prescan image representation of mining wall 16 simultaneously while and second robot 102 at second location "B" performs visual servoing for positioning one or more charging component for entry into a drill hole 18 to obtain one or more visual servoing image representation of mining wall 16. In one embodiment, system 100 can be operative so that first robot 102 at first location "A" performs a scan to obtain one or more scan image representation of mining wall 16 simultaneously while second robot 102 at second location "B" performs visual servoing for positioning one or more charging component for entry into a drill hole 18 to obtain one or more visual servoing image representation of mining wall 16. Where operative so that first and second robots with respect to a mining wall 16 simultaneously, system 100 can be operative so that the first and second robots are restricted from working within a threshold distance away from another so as to prevent collision between the first and second robots.

Referring again FIG. 12, all of the functions described with reference to the flow diagram of FIG. 12 in one embodiment can be performed with system 100 operating in an automated mode of operation as set forth herein (wherein functions performed by system 100 can be independent of any current operator input with the automated operating mode of operation active) without transitioning to a teleoperation mode of operation. Referring still to FIG. 12, all of the functions described with reference to the flow diagram of FIG. 12 in one embodiment can be performed with system 100 operating in a teleoperation operating mode of operation without transitioning to an automated mode of operation. Referring still to FIG. 12, the functions described with reference to the flow diagram of FIG. 12 in one embodiment can be performed with system 100 transitioning one or more times between an automated mode of operation and a teleoperation mode of operation.

Referring again FIG. 13, all of the functions described with reference to the flow diagram of FIG. 13 in one embodiment can be performed with system 100 operating in an automated mode of operation as set forth herein (wherein functions performed by system 100 can be independent of any current operator input with the automated operating mode of operation active) without transitioning to a teleoperation mode of operation. Referring still to FIG. 13, all of the functions described with reference to the flow diagram of FIG. 13 in one embodiment can be performed with system 100 operating in a teleoperation operating mode of operation without transitioning to an automated mode of operation. Referring still to FIG. 13, the functions described with reference to the flow diagram of FIG. 13 in one embodiment can be performed with system 100 transitioning one or more times between an automated mode of operation and a teleoperation mode of operation.

Referring again FIG. 14, all of the functions described with reference to the flow diagram of FIG. 14 in one embodiment can be performed with system 100 operating in an automated mode of operation as set forth herein (wherein functions performed by system 100 can be independent of any current operator input with the automated operating mode of operation active) without transitioning to a teleoperation mode of operation. Referring still to FIG. 14, all of the functions described with reference to the flow diagram of FIG. 14 in one embodiment can be performed with system 100 operating in a teleoperation operating mode of operation without transitioning to an automated mode of operation. Referring still to FIG. 14, the functions described with reference to the flow diagram of FIG. 14 in one embodiment can be performed with system 100 transitioning one or more times between an automated mode of operation and a teleoperation mode of operation.

Referring again FIG. 18, all of the functions described with reference to the flow diagram of FIG. 18 in one embodiment can be performed with system 100 operating in an automated mode of operation as set forth herein (wherein functions performed by system 100 can be independent of any current operator input with the automated operating mode of operation active) without transitioning to a teleoperation mode of operation. Referring still to FIG. 18, all of the functions described with reference to the flow diagram of FIG. 18 in one embodiment can be performed with system 100 operating in a teleoperation operating mode of operation without transitioning to an automated mode of operation. Referring still to FIG. 18, the functions described with reference to the flow diagram of FIG. 18 in one embodiment can be performed with system 100 transitioning one or more times between an automated mode of operation and a teleoperation mode of operation.

Referring again FIG. 19, all of the functions described with reference to the flow diagram of FIG. 19 in one embodiment can be performed with system 100 operating in an automated mode of operation as set forth herein (wherein functions performed by system 100 can be independent of any current operator input with the automated operating mode of operation active) without transitioning to a teleoperation mode of operation. Referring still to FIG. 19, all of the functions described with reference to the flow diagram of FIG. 19 in one embodiment can be performed with system 100 operating in a teleoperation operating mode of operation without transitioning to an automated mode of operation. Referring still to FIG. 19, the functions described with reference to the flow diagram of FIG. 19 in one embodiment can be performed with system 100 transitioning one or more times between an automated mode of operation and a teleoperation mode of operation.

Referring again FIG. 23, all of the functions described with reference to FIG. 23 in one embodiment can be performed with system 100 operating in an automated mode of operation as set forth herein (wherein functions performed by system 100 can be independent of any current operator input with the automated operating mode of operation active) without transitioning to a teleoperation mode of operation. Referring still to FIG. 23, all of the functions described with reference to the flow diagram of FIG. 23 in one embodiment can be performed with system 100 operating in a teleoperation operating mode of operation without transitioning to an automated mode of operation. Referring still to FIG. 23, the functions described with reference to the flow diagram of FIG. 23 in one embodiment can be performed with system 100 transitioning one or more times between an automated mode of operation and a teleoperation mode of operation.

With reference again to FIG. 3, FIG. 3 depicts system 100 to incorporate and use aspects described herein. System 100 includes robot 102, robot controller 150, operator computer system 170, and backend computer system 160, all coupled via communication links 140*a*-140*d*. The physical locations of these components relative to one another can vary. For instance, they may be as close together as a few feet or as far apart as thousands of miles or more.

Communication links 140*a*-140*d* between the components may be realized by any of various wireless and/or wired technologies (e.g. fiber-optic/radio/cable on different types and layers of data protocols). In some embodiments, one or more such communication links includes existing infrastructure, such as existing Ethernet installations operating over one or more local or wide area network(s). A non-limiting list of additional communication link technologies includes wireless-LAN (WLAN), Bluetooth, ZigBee, near-field, or other wireless links, point-to-point radio systems or laser-optical systems, and satellite communication links, as examples.

Robot 102 may be any type of robot, such as an industrial robot offered by ABB Inc. of Auburn Hills, Mich., U.S.A., as an example. Exemplary robots have several (usually 4, 5, 6 or 7) degrees of freedom enabling them to perform any of various tasks usually characterized by the movement and/or manipulation of objects. In this regard, a robot refers in its broadest sense to an assembly that has multiple degrees of freedom.

Robot functions are served by different, and typically application-specific, components, some of which are depicted as part of robot 102 of FIG. 3. It should be understood that robot 102 includes additional components omitted from FIG. 3 for convenience purposes, and further that a robot to incorporate/use aspects described herein need not necessarily include each of the components depicted in FIG. 3.

Camera system 104 provides imaging functions enabling the robot to 'see' physical objects in its environment. Camera system 104 may be realized by proprietary and/or application-specific imaging device(s) or commercial off-the-shelf (COTS) offerings providing 2-dimensional, 3-dimensional, and/or depth-sensing imaging capabilities. An example COTS product is the Kinect® motion controller offered by Microsoft Corporation. Vision assistance system 106 is another type of sensor system providing vision capabilities for the robot. It can also include imaging device(s) for imaging objects of the environment to assist in proximity or other spatial determinations. In some embodiments, the camera system 104 is mounted on the robot at or near a 'head' thereof providing a roughly first person perspective of the robot's activities, while the vision assistance system 106 includes multiple cameras mounted around the robot 102 and imaging the robot 102 and its surroundings to provide a third person perspective of robot activities with respect to the surrounding objects.

Other sensor/sensor devices 108 are included to provide additional sensing capabilities. The particular additional sensors may be dependent on the types of tasks the robot will perform when in operation. A non-limiting list of additional sensors are microphones, position sensors, proximity sensors, and force/pressure sensors, as examples. Some sensor devices can include data processing capabilities. So-called smart sensors are usually, though not always, connected directly to robot controller 150 via communication link(s). Other types of sensors that lack on-board data processing capability to process captured data may provide data to a separate data processing device (such as robot controller 150, backend computer system 160, operator computer system 170, and/or another computer system, not pictured) to process the sensor device output.

Some sensors may be local to or remote from the robot 102 or robot controller 150. Remote sensor devices can provide input signals to the robot controller 150 that the robot controller 150 uses to control the robot 102 in performance of work described herein.

Some sensors that are mounted either on the robot 102 or at other locations can detect, or provide data that is processed to detect, obstacles that enter into or otherwise appear in the workspace of the robot 102. Sensor information including data about the detected obstacle can be processed and used by robot controller 150 for position and other geometric information. With respect to a smart sensor, a data processing capability thereof can fully or partially process sensor information and transfer to the robot controller 150 only the relevant data about the obstacle. In other types of sensors that lack data processing capability, the sensor information can be processed by another data processing device as described above and provided to robot controller 150.

The robot 102 can also include a tool assembly 102T having actuator(s) or other devices (collectively referred to as actuator system 110) incorporated into, mounted to, or next to, the robot 102 to provide object manipulation capabilities for manipulating or moving objects. Actuator system 110 may include grippers, claws, fixtures, suction devices, conveyors, twisting mechanisms, charging hose and/or wire feeder mechanisms, and specialized equipment like medical tools, welding guns, or spraying guns. Tool assembly 102T can be disposed at an end of a robot arm defined e.g. by links 102L and joints 102J.

Robot controller 150 provides motion data to robot 102 to control actions thereof. Motion data includes commands, as examples, sent to and received by component(s) of the robot that cause the components to drive robot actions, movement to other locations, and other activities. Accordingly, robot controller 150 may be a computer system having programs (i.e. instructions, program code) that execute to provide motion data to the robot 102 to control motion of the robot 102 to perform work. For instance, the robot 102 may hold a tool (not shown) used to perform work on a stationary or moving workpiece (also not shown), or may hold the workpiece to have work performed on it by an appropriate tool, as examples. As further examples, the robot 102 may include a feeder component to feed a charging hose 202 or other object into drill holes 18 or other spaces to accomplish a task such as planting explosive material. The feeder component may include a twisting mechanism configured to twist the charging hose 202 or other object in order to more reliably reach desired locations.

Sensor information provided to the robot controller 150 directly or indirectly, such as via a data processing component to process sensor data, may be used to generate a safety zone in which the robot 102 may work. When obstacles enter into the workspace of the robot 102, based on positioning of the obstacle or the robot 102, a map can be built to inform the robot controller 150 of the safety zone. Additionally, information from sensor(s) or other components, such as camera system 104, vision assistance system 106 and/or sensor/sensing device 108, can be used by the robot controller to build a distance map and/or 2/3-dimensional map. In some examples, raw sensor information is processed to build the map.

Robot controller 150 is in communication with operator computer system 170 used in controlling and/or observing robot behavior. The operator computer system 170 can show on a display thereof actual data about robot motion and attached processes, for example, camera images, acoustic feedback, and sensor values. Additionally, operator computer system 170 can act as a data processing device for sensor information, and can process data in both directions (i.e. data to/from the sensors). Operator computer system 170 may be implemented by any computer system desired, for instance an industrial personal computer or a programmable logic controller, as examples.

Some embodiments may feature at least partial control of the robot 102 by operator computer system 170. The operator computer system 170 can play a role in dictating, selecting, building, and/or providing commands or other signals to the robot 102 and/or robot controller 150 to cause the robot 102 to perform actions. In some examples, the operator computer system 170 can include at least one actuator, such as joysticks or stylus-type devices that the operator can use to create continuous motion signals (position and/or speed signals) that can be provided to the robot 102 directly or via robot controller 150. Some actuators can provide feedback to an operator based on, for example, input from sensors of the robot 102. Feedback can be any kind of feedback that can be sensed by an operator. An example is haptic or force feedback that causes a vibration in a joystick or a stylus. An actuator provided by a haptic motion controller can provide tactile feedback to an operator. In one embodiment, a haptic motion controller can be a PHANTOM OMNI® motion controller available from Sensable Technologies. In one embodiment, as set forth herein, system 100 can be operative to provide motion to one or more charging component that corresponds to motion that is imparted to motion imparted by an operator to an actuator such as a haptic motion controller.

The operator computer system can also include a safety enable device, such as a three-position switch, to provide the ability for the operator to enable or disable power to the robot 102 and/or other components of the system 100.

Backend computer system 160 can provide additional local or remote computing resources to support robot controller, operator computer system 170, and/or robot 102. In this regard, control of the robot 102 and/or other processes supporting robot tasks may be more demanding than can be handled by the front-end systems. A local or remote backend facility may be provided by backend computer system 160, and the front-end components can off-load work to the backend computer system 160. By way of specific example, processing of image data, especially 3-dimensional image data, may present a significant burden on the robot 102, sensors thereof, and/or robot controller 150. The image data may be provided in part or whole to backend computer system 160 for processing and results can be provided back to the robot controller 150 or another component for use in robot processes.

As mentioned prior, components of system 100 need not be located adjacent to each other. Backend computer system 160 may be located on-site or offsite, for instance as a remote cloud-based computing facility that offers a web-based data-processing solution.

One or more of the foregoing components of system 100 may be encompassed by, or included in, one or more other of the foregoing components. Similarly, functionality described above of a given component may be incorporated into a different component of the foregoing components. Backend compute resources provided by backend computer system 160, for example, may be included in the robot controller 150 or operator computer system 170, or vice versa. In some embodiments, functionality of robot controller 150 and/or operator computer system 170 is incorporated into backend computer system 160.

Processes described herein may be performed by one or more computer systems or other processing devices, as provided, e.g. by robot 102, robot controller 150, backend computer system 160 and operator computer system 170 as set forth herein. An example computer system to incorporate and use aspects described herein is depicted and described with reference to FIG. 24. Computer system 800 includes one or more processors 802, memory 804, and one or more I/O devices 806, which may be coupled to each other by busses and other electrical hardware elements (not depicted). Processor(s) 802 include any appropriate hardware component(s) capable of implementing functions, for instance executing instruction(s) (sometimes alternatively referred to as code, firmware and/or software) retrieved from memory 804. Execution of the instructions causes the computer system 800 to perform processes, functions, or the like, such as those described herein supporting control and/or operation of a robot, and described herein with reference to the flow diagrams of FIGS. 12-19.

In some examples, aspects described herein are performed by a plurality of homogenous or heterogeneous computer systems coordinated to collectively perform processes, functions, or the like, such as those described herein supporting control and/or operation of a robot.

Memory 804 includes hardware components or other storage devices to store data such as programs of instructions for execution, and other data. The storage devices may be magnetic, optical, and/or electrical-based, as examples. Hard drives, field-programmable gate arrays (FPGAs), magnetic media, compact disks (CDs), digital versatile disks (DVDs), and flash memories are example storage devices. Accordingly, memory 804 may be volatile, non-volatile, or a combination of the two. As a specific example, memory 804 includes one or more hard drives and one or more random-access memory (RAM) devices for, respectively, non-volatile and volatile storage of data. Example programs stored by memory include an operating system and applications that run on the operating system, such as specialized applications to perform functions described herein. Memory 804 can store image representations obtained using camera system 104.

I/O device(s) 806 include hardware and/or software components that support input and output of data to/from computer system 800. I/O device(s) 806 include physical components that attach physically or wirelessly to the computer system and/or integrate into the computer system, such as keyboards, mice, display devices, joysticks, camera devices, compact disks, thumb drives, printers, global positioning system (GPS) devices, gyroscopes, magnetometers, light sensors, proximity sensors, microphones, speakers, or accelerometers, as examples. I/O devices 806 also include, but are not limited to, I/O controllers and hardware and software supporting data communication with the aforementioned components, such as network, graphics, and/or audio controller(s). An example I/O device 806 is a network adapter for communication of data between computer system 800 and another component, such as another computer system, across communication links. Examples include Ethernet, cable, and/or fiber-based communications links passing data packets between computer system 800 and other systems across one or more networks, such as the Internet. Other example I/O devices 806 include universal serial bus (USB), peripheral component interconnect (PCI), and serial adapters/interfaces configured to couple to devices of their respective kind.

A non-limiting list of example computer systems includes: personal computers (PCs), laptops, workstations, servers, mainframes, network appliances, virtualization devices, computing terminals, personal digital assistants, cellular telephones and smartphones, wearable devices ("wearables"), tablet computers, and sensors such as cameras or camera systems.

Figure 25:
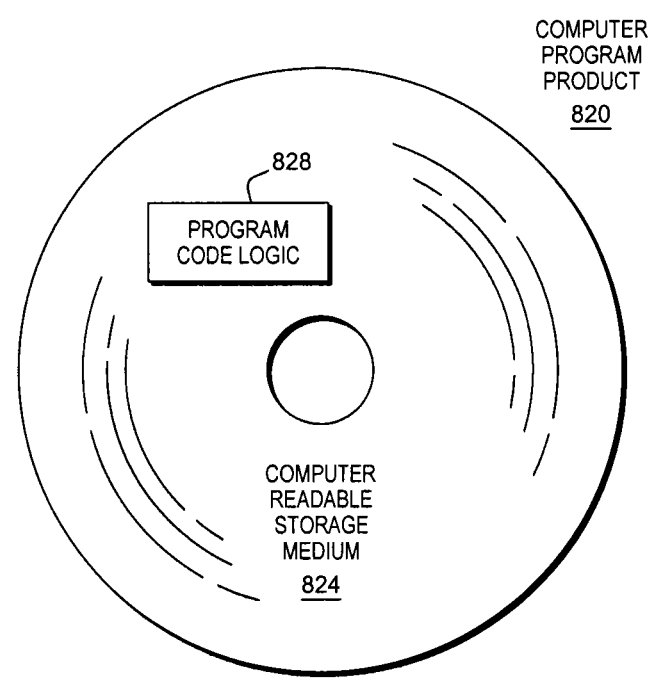
FIG. 25 is a diagram illustrating a computer readable medium in one embodiment.

Accordingly, aspects described herein may take the form of one or more systems, methods/processes, and/or a computer program products. A computer program product may be a computer-readable, tangible storage medium or device that stores instructions. In some embodiments, the computer program product is non-transitory computer readable storage media. Referring to FIG. 25, an example computer program product 820 is depicted that includes, for instance, one or more computer readable storage media 824 to store computer-readable program code means, logic and/or instructions 828 thereon to provide and facilitate one or more embodiments described herein.

A computer-readable storage medium can be, as examples, electronic, magnetic, electromagnetic, optical, and/or semi-conductor-based. Examples include but are not limited to: random access memory, read-only memory, computer disks, flash memory, and optical storage media like compact disks (CDs) or digital versatile disks (DVDs). As specifically used herein, computer-readable storage media does not per se consist of transitory signals, such as radio waves or other propagating signals.

Program code contained or stored in/on a computer readable storage medium can be obtained and executed by a computer system (computer, processing system, data processing system, etc. including a component thereof) and/or other device to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects described herein may be written in one or more programming languages. In some embodiments, the programming language(s) include object-oriented and/or procedural programming languages such as C, C++, C#, Java, etc. Program code may execute entirely or partially on the computer system, a remote computer system, or a combination of partially on the computer system and partially on a remote computer system.

Program code can include program instructions obtained for execution by processor(s). Computer program instructions may be provided to processor(s) of, e.g., a computer system, to produce a machine, such that the program instructions, when executed by the processor(s), perform, achieve, or facilitate aspects described herein, such as actions, processes, or functions described in flowcharts and/or block diagrams described herein. Thus, each block, or combinations of blocks, of the flowchart illustrations and/or block diagrams depicted and described herein can be implemented, in some embodiments, by computer program instructions. Behaviors/functions specified or performed by one or more blocks may occur in a different order than depicted and/or described, or may occur simultaneous to, or partially/wholly concurrent with, one or more other blocks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: placing a robot at a position in front of a mining wall, the robot having a tool assembly that includes a camera system. The method also includes obtaining one or more image representation using the camera system; positioning with the robot one or more charging component for entry into a drill hole, the positioning including using image data obtained with the camera system. The method also includes moving with the robot the one or more charging component within the drill hole; and feeding with the robot explosive material into the drill hole. Other embodiments of this aspect include corresponding computer systems, apparatus, and computer programs recorded on one or more computer storage devices, each configured to perform the actions of the methods.

Implementations may include one or more of the following features. The method where the method includes registering detected drill holes detected using the one or more image representation in a drilling map. The method where the obtaining includes performing a prescan of a wall and determining a scan path based on image data obtained during the prescan, and where the obtaining further includes scanning a wall and detecting drill holes represented in image data obtained during the scanning. The method where the method includes picking up one or more component of the one or more charging component from a magazine. The method where the method includes activating the magazine to assemble a primer to a detonator of a detonator package. The method where the robot holds a charging hose, where the method includes picking up a detonator package with the robot, where the picking up includes disposing the charging hose about a detonator package. The method where the robot holds a charging hose, where the method includes disposing the charging hose held by the robot about a detonator package so that the detonator package is held by the charging hose, where the method includes inserting the charging hose and the detonator package held by the charging hose into the drill hole. The method where the robot holds a charging hose, where the method includes disposing the charging hose held by the robot about a detonator package so that the detonator package is held by the charging hose, where the method includes inserting the charging hose and the detonator package held by the charging hose into the drill hole, where the method includes feeding charging material through the charging hose into the drill hole while retracting the charging hose from the drill hole with the robot. The method where the method includes determining whether all detected drill holes have been filled, and picking up a next detonator package if all detected drill holes have not been filled. The method where the one or more charging component is selected from the group including of a charging hose, a detonator, a primer, a signal wire, and explosive material. The method where the tool assembly includes a camera system, where the positioning includes determining based on one or more image representation obtained with the camera system whether the tool assembly is properly positioned for entry into a drill hole and responsively to a determination that the tool assembly is not properly positioned positioning the tool assembly based on one or more operator input. The method where the method includes obtaining one or more image representation with a camera system, where the method includes detecting a drill hole representation of the drill hole in the one or more image representation, and registering the drill hole as a detected hole in a drilling map. The method where the method includes providing a drilling map having information of a sequence of drill holes to charge and a detonator package associated to first and second of drill holes of the sequence of drill holes, and where the method includes using the drilling map to select a proper detonator package for use in charging a current drill hole being subject to charging. The method where the moving with the robot the one or more component within the drill hole includes moving the one or more component from an opening of the drill hole to a distal end of the drill hole in an automated operating mode, where movement of the one or more component is independent of any current operator input with the automated operating mode active. The method where image data of the one or more image representation includes 3D point cloud image data. The method where the tool assembly is operative to rotate the charging hose back and forth about a longitudinal axis of the charging hose to overcome obstruction of feeding the charging hose in the drill hole. The method where the obtaining includes obtaining with the tool assembly the detonator package in the hollow end of the charging hose from a magazine supporting a plurality of detonator packages. The method where the magazine is operative for assembling a plurality of primers onto a plurality of detonators. The method where the detonator package includes a detonator, a primer, and a signal wire. The method where the tool assembly includes a 3D camera system. The method where the positioning is based on a drilling map, the drilling map indicating a location of a plurality of drill holes. The method where the tool assembly includes a camera system, where the positioning includes positioning a charging hose based on one or more image representation obtained with the camera system, and where obtaining the one or more image representation includes merging together image data from a plurality image representations of a plurality of portions of a mining wall. The method where the robot is operative to perform one or more obstruction avoidance routine selected from the group including a push forward, retract, rotate, and wiggle. The method further including selecting the detonator package based on an operator input. The method where the charging hose is configured to be friction fit about a primer of a detonator package. The robot system where the robot system is configured to transition from the automated mode of operation to the teleoperation mode of operation in response to a sensed condition being sensed. The robot system where the robot system is configured to transition from the automated mode of operation to the teleoperation mode of operation based on one or more operator input. The robot system where the one or more charging component is one or more of a charging hose, a detonator, a primer or a signal wire. The robot system where for a time that the automated mode of operation is active the robot with the tool assembly performs the charging component positioning procedure independent of any current operator input. The robot system where the charging component positioning procedure is a positioning procedure for moving a charging component from an opening of a drill hole through to a distal end of the drill hole. The robot system where the charging component positioning procedure is a positioning procedure for avoiding an obstruction within a drill hole. The robot system where the charging component positioning procedure is a positioning procedure for positioning a charging component for entry into a drill hole. The robot system where the tool assembly includes a camera system, and where the robot system deactivates the automated mode of operation based on one or more image representation obtained with the camera system. The robot system where the robot system is configured to transition from the automated mode of operation to the teleoperation mode of operation in response to a sensed condition being sensed, the sensed condition being the condition that the one or more charging component has not reached a distal end of a drill hole. The robot system where the tool assembly includes a camera system, where the robot system is configured to transition from the automated mode of operation to the teleoperation mode of operation in response to a sensed condition being sensed, the sensed condition being the condition that the one or more charging component is not positioned properly for drill hole entry, the sensed condition being determined by processing of one or more image representation obtained with the camera system. The robot system where the robot system in the teleoperation mode of operation activates a charging component positioning procedure selected from a group including (a) pushing in (b) retracting (c) rotating and (d) wiggling based on one or more operator input. The robot system where the robot system in the teleoperation mode of operation provides motion to the one or more charging component that corresponds to motion that is imparted by an operator to an actuator of an operator computer system. The robot system where the one or more operator input is an input of a supervisor operator entered into a user interface of a remote operator computer system located remote from the robot. The method where the activating includes displaying on a display image data of the one or more image representation. The method where the activating includes displaying on a display image data of the one or more image representation with a highlight selectable by an operator. The method where the first one or more image representation and the second one or more image representation include 3D point cloud image data. The method where the out putted result includes an indication of a volume of material removed from the mining wall by the blasting. The robot system where the tool assembly is operative to perform each of (a) pushing the one or more charging component forwardly, (b) retracting the one or more charging component, and (c) rotating the one or more charging component. The robot system where the camera system is a 3D camera system for use in obtaining 3D point cloud image data. The robot system where the one or more charging component includes a charging hose and where the robot is operative to feed explosive material through the charging hose while retracting the charging hose. The robot system where the robot for performing the one or more movement provides motion to the one or more charging component that corresponds to motion currently being imparted to an actuator by an operator. The robot system where the robot is configured to operate in an automated mode of operation in which the robot with the tool assembly automatically performs a charging component positioning procedure for controlling a positioning of one or more charging component, where the charging component positioning procedure is selected from the group including of (a) a procedure for moving the one or more charging component from an opening of a drill hole to the distal end of the drill hole, (b) a procedure for positioning the one or more charging component for drill hole entry, and (c) a procedure for positioning the one or more charging component to avoid an obstruction within a drill hole. Implementations of the described techniques may include hardware, a method or process, or computer software on a computer-accessible medium.

One general aspect includes a method including: obtaining with a tool assembly of a robot a detonator package in a hollow end of a charging hose. The method also includes positioning with the tool assembly the charging hose having the detonator package adjacent to an opening of a drill hole. The method also includes moving with the tool assembly the charging hose having the detonator package along a length of the drill hole so that the detonator package and an end of the charging hose is disposed at a distal end of the drill hole. The method also includes feeding explosive material into the charging hose to deposit the detonator package at the distal end of the drill hole and deposit explosive material along the length of the drill hole while removing the charging hose from the drill hole. Other embodiments of this aspect include corresponding computer systems, apparatus, and computer programs recorded on one or more computer storage devices, each configured to perform the actions of the methods.

Implementations may include one or more of the following features. The method where the tool assembly is operative to rotate the charging hose back and forth about a longitudinal axis of the charging hose to overcome obstruction of feeding the charging hose in the drill hole. The method where the obtaining includes obtaining with the tool assembly the detonator package in the hollow end of the charging hose from a magazine supporting a plurality of detonator packages. The method where the magazine is operative for assembling a plurality of primers onto a plurality of detonators. The method where the detonator package includes a detonator, a primer, and a signal wire. The method where the tool assembly includes a 3D camera system. The method where the positioning is based on a drilling map, the drilling map indicating a location of a plurality of drill holes. The method where the tool assembly includes a camera system, where the positioning includes positioning a charging hose based on one or more image representation obtained with the camera system, and where obtaining the one or more image representation includes merging together image data from a plurality image representations of a plurality of portions of the mining wall. The method where the robot is operative to perform one or more obstruction avoidance routine selected from the group including a push forward, retract, rotate, and wiggle. The method further including selecting the detonator package based on an operator input. The method where the charging hose is configured to be friction fit about a primer of a detonator package. The robot system where the robot system is configured to transition from the automated mode of operation to the teleoperation mode of operation in response to a sensed condition being sensed. The robot system where the robot system is configured to transition from the automated mode of operation to the teleoperation mode of operation based on one or more operator input. The robot system where the one or more charging component is one or more of a charging hose, a detonator, a primer or a signal wire. The robot system where for a time that the automated mode of operation is active the robot with the tool assembly performs the charging component positioning procedure independent of any current operator input. The robot system where the charging component positioning procedure is a positioning procedure for moving a charging component from an opening of a drill hole through to a distal end of the drill hole. The robot system where the charging component positioning procedure is a positioning procedure for avoiding an obstruction within a drill hole. The robot system where the charging component positioning procedure is a positioning procedure for positioning a charging component for entry into a drill hole. The robot system where the tool assembly includes a camera system, and where the robot system deactivates the automated mode of operation based on one or more image representation obtained with the camera system. The robot system where the robot system is configured to transition from the automated mode of operation to the teleoperation mode of operation in response to a sensed condition being sensed, the sensed condition being the condition that the one or more charging component has not reached a distal end of a drill hole. The robot system where the tool assembly includes a camera system, where the robot system is configured to transition from the automated mode of operation to the teleoperation mode of operation in response to a sensed condition being sensed, the sensed condition being the condition that the one or more charging component is not positioned properly for drill hole entry, the sensed condition being determined by processing of one or more image representation obtained with the camera system. The robot system where the robot system in the teleoperation mode of operation activates a charging component positioning procedure selected from a group including (a) pushing in (b) retracting (c) rotating and (d) wiggling based on one or more operator input. The robot system where the robot system in the teleoperation mode of operation provides motion to the one or more charging component that corresponds to motion that is imparted by an operator to an actuator of an operator computer system. The robot system where the one or more operator input is an input of a supervisor operator entered into a user interface of a remote operator computer system located remote from the robot. The method where the activating includes displaying on a display image data of the one or more image representation. The method where the activating includes displaying on a display image data of the one or more image representation with a highlight selectable by an operator.

The method where the first one or more image representation and the second one or more image representation include 3D point cloud image data. The method where the out putted result includes an indication of a volume of material removed from the mining wall by the blasting. The robot system where the tool assembly is operative to perform each of (a) pushing the one or more charging component forwardly, (b) retracting the one or more charging component, and (c) rotating the one or more charging component. The robot system where the camera system is a 3D camera system for use in obtaining 3D point cloud image data. The robot system where the one or more charging component includes a charging hose and where the robot is operative to feed explosive material through the charging hose while retracting the charging hose. The robot system where the robot for performing the one or more movement provides motion to the one or more charging component that corresponds to motion currently being imparted to an actuator by an operator. The robot system where the robot is configured to operate in an automated mode of operation in which the robot with the tool assembly automatically performs a charging component positioning procedure for controlling a positioning of one or more charging component, where the charging component positioning procedure is selected from the group including of (a) a procedure for moving the one or more charging component from an opening of a drill hole to the distal end of the drill hole, (b) a procedure for positioning the one or more charging component for drill hole entry, and (c) a procedure for positioning the one or more charging component to avoid an obstruction within a drill hole. Implementations of the described techniques may include hardware, a method or process, or computer software on a computer-accessible medium.

One general aspect includes a robot system including: a robot having a tool assembly. The robot system also includes where the robot system is configured to operate in an automated mode of operation in which the robot with the tool assembly automatically performs a charging component positioning procedure for controlling a positioning of one or more charging component. The robot system also includes where the robot system is configured to operate in a teleoperation mode of operation in which the robot with the tool assembly performs the charging component positioning procedure for controlling the position of the one or more charging component based on one or more operator input. Other embodiments of this aspect include corresponding computer systems, apparatus, and computer programs recorded on one or more computer storage devices, each configured to perform the actions of the methods.

Implementations may include one or more of the following features. The robot system where the robot system is configured to transition from the automated mode of operation to the teleoperation mode of operation in response to a sensed condition being sensed. The robot system where the robot system is configured to transition from the automated mode of operation to the teleoperation mode of operation based on one or more operator input. The robot system where the one or more charging component is one or more of a charging hose, a detonator, a primer or a signal wire. The robot system where for a time that the automated mode of operation is active the robot with the tool assembly performs the charging component positioning procedure independent of any current operator input. The robot system where the charging component positioning procedure is a positioning procedure for moving a charging component from an opening of a drill hole through to a distal end of the drill hole. The robot system where the charging component positioning procedure is a positioning procedure for avoiding an obstruction within a drill hole. The robot system where the charging component positioning procedure is a positioning procedure for positioning a charging component for entry into a drill hole. The robot system where the tool assembly includes a camera system, and where the robot system deactivates the automated mode of operation based on one or more image representation obtained with the camera system. The robot system where the robot system is configured to transition from the automated mode of operation to the teleoperation mode of operation in response to a sensed condition being sensed, the sensed condition being the condition that the one or more charging component has not reached a distal end of a drill hole. The robot system where the tool assembly includes a camera system, where the robot system is configured to transition from the automated mode of operation to the teleoperation mode of operation in response to a sensed condition being sensed, the sensed condition being the condition that the one or more charging component is not positioned properly for drill hole entry, the sensed condition being determined by processing of one or more image representation obtained with the camera system. The robot system where the robot system in the teleoperation mode of operation activates a charging component positioning procedure selected from a group including (a) pushing in (b) retracting (c) rotating and (d) wiggling based on one or more operator input. The robot system where the robot system in the teleoperation mode of operation provides motion to the one or more charging component that corresponds to motion that is imparted by an operator to an actuator of an operator computer system. The robot system where the one or more operator input is an input of a supervisor operator entered into a user interface of a remote operator computer system located remote from the robot. The method where the activating includes displaying on a display image data of the one or more image representation. The method where the activating includes displaying on a display image data of the one or more image representation with a highlight selectable by an operator. The method where the first one or more image representation and the second one or more image representation include 3D point cloud image data. The method where the out putted result includes an indication of a volume of material removed from the mining wall by the blasting. The robot system where the tool assembly is operative to perform each of (a) pushing the one or more charging component forwardly, (b) retracting the one or more charging component, and (c) rotating the one or more charging component. The robot system where the camera system is a 3D camera system for use in obtaining 3D point cloud image data. The robot system where the one or more charging component includes a charging hose and where the robot is operative to feed explosive material through the charging hose while retracting the charging hose. The robot system where the robot for performing the one or more movement provides motion to the one or more charging component that corresponds to motion currently being imparted to an actuator by an operator. The robot system where the robot is configured to operate in an automated mode of operation in which the robot with the tool assembly automatically performs a charging component positioning procedure for controlling a positioning of one or more charging component, where the charging component positioning procedure is selected from the group including of (a) a procedure for moving the one or more charging component from an opening of a drill hole to the distal end of the drill hole, (b) a procedure for positioning the one or more charging component for drill hole entry, and (c) a procedure for positioning the one or more charging component to avoid an obstruction within a drill hole. Implementations of the described techniques may include hardware, a method or process, or computer software on a computer-accessible medium.

One general aspect includes a method including: obtaining with a robot camera system one or more image representation of a mining wall having a plurality of drill holes, the one or more image representation including 3D point cloud image data. The method also includes comparing a drilling map characterizing the mining wall to the one or more image representation to perform identification of a drill hole of the drilling map not detected in the one or more image representation. The method also includes in response to the identification of a drill hole of the drilling map not detected in the one or more image representation, activating operation where a robot system, based on one or more input of an operator, designates image data of the one or more image representation as being representative of the drill hole. Other embodiments of this aspect include corresponding computer systems, apparatus, and computer programs recorded on one or more computer storage devices, each configured to perform the actions of the methods.

Implementations may include one or more of the following features. The method where the activating includes displaying on a display image data of the one or more image representation. The method where the activating includes displaying on a display image data of the one or more image representation with a highlight selectable by an operator. The method where the first one or more image representation and the second one or more image representation include 3D point cloud image data. The method where the out putted result includes an indication of a volume of material removed from the mining wall by the blasting. The robot system where the tool assembly is operative to perform each of (a) pushing the one or more charging component forwardly, (b) retracting the one or more charging component, and (c) rotating the one or more charging component. The robot system where the camera system is a 3D camera system for use in obtaining 3D point cloud image data. The robot system where the one or more charging component includes a charging hose and where the robot is operative to feed explosive material through the charging hose while retracting the charging hose. The robot system where the robot for performing the one or more movement provides motion to the one or more charging component that corresponds to motion currently being imparted to an actuator by an operator. The robot system where the robot is configured to operate in an automated mode of operation in which the robot with the tool assembly automatically performs a charging component positioning procedure for controlling a positioning of one or more charging component, where the charging component positioning procedure is selected from the group including of (a) a procedure for moving the one or more charging component from an opening of a drill hole to the distal end of the drill hole, (b) a procedure for positioning the one or more charging component for drill hole entry, and (c) a procedure for positioning the one or more charging component to avoid an obstruction within a drill hole. Implementations of the described techniques may include hardware, a method or process, or computer software on a computer-accessible medium.

One general aspect includes a method including: obtaining with a robot camera system a first one or more image representation of a mining wall in a state prior to blasting, the robot camera system being disposed on an arm of a robot. The method also includes obtaining with the robot camera system a second one or more image representation of mining wall in a state subsequent to blasting. The method also includes comparing the first one or more image representation to the second one or more image representation. The method also includes outputting a result of the comparing. Other embodiments of this aspect include corresponding computer systems, apparatus, and computer programs recorded on one or more computer storage devices, each configured to perform the actions of the methods.

Implementations may include one or more of the following features. The method where the first one or more image representation and the second one or more image representation include 3D point cloud image data. The method where the out putted result includes an indication of a volume of material removed from the mining wall by the blasting. The robot system where the tool assembly is operative to perform each of (a) pushing the one or more charging component forwardly, (b) retracting the one or more charging component, and (c) rotating the one or more charging component. The robot system where the camera system is a 3D camera system for use in obtaining 3D point cloud image data. The robot system where the one or more charging component includes a charging hose and where the robot is operative to feed explosive material through the charging hose while retracting the charging hose. The robot system where the robot for performing the one or more movement provides motion to the one or more charging component that corresponds to motion currently being imparted to an actuator by an operator. The robot system where the robot is configured to operate in an automated mode of operation in which the robot with the tool assembly automatically performs a charging component positioning procedure for controlling a positioning of one or more charging component, where the charging component positioning procedure is selected from the group including of (a) a procedure for moving the one or more charging component from an opening of a drill hole to the distal end of the drill hole, (b) a procedure for positioning the one or more charging component for drill hole entry, and (c) a procedure for positioning the one or more charging component to avoid an obstruction within a drill hole. Implementations of the described techniques may include hardware, a method or process, or computer software on a computer-accessible medium.

One general aspect includes a robot system including: a robot including a robot arm, the robot arm having a plurality of links and a plurality of joints. The robot system also includes a tool assembly disposed at a distal end of the robot arm, where the tool assembly has a camera system for use in obtaining image data, and where the tool assembly is configured to hold one or more charging component. The robot system also includes where the tool assembly is operative to perform one or more movement selected from a group including (a) pushing the one or more charging component forwardly, (b) retracting the one or more charging component, and (c) rotating the one or more charging component. Other embodiments of this aspect include corresponding computer systems, apparatus, and computer programs recorded on one or more computer storage devices, each configured to perform the actions of the methods.

Implementations may include one or more of the following features. The robot system where the tool assembly is operative to perform each of (a) pushing the one or more charging component forwardly, (b) retracting the one or more charging component, and (c) rotating the one or more charging component. The robot system where the camera system is a 3D camera system for use in obtaining 3D point cloud image data. The robot system where the one or more charging component includes a charging hose and where the robot is operative to feed explosive material through the charging hose while retracting the charging hose. The robot system where the robot for performing the one or more movement provides motion to the one or more charging component that corresponds to motion currently being imparted to an actuator by an operator. The robot system where the robot is configured to operate in an automated mode of operation in which the robot with the tool assembly automatically performs a charging component positioning procedure for controlling a positioning of one or more charging component, where the charging component positioning procedure is selected from the group including of (a) a procedure for moving the one or more charging component from an opening of a drill hole to the distal end of the drill hole, (b) a procedure for positioning the one or more charging component for drill hole entry, and (c) a procedure for positioning the one or more charging component to avoid an obstruction within a drill hole. Implementations of the described techniques may include hardware, a method or process, or computer software on a computer-accessible medium.

While the present application has been described with reference to a number of specific embodiments, it will be understood that the true spirit and scope of the application should be determined only with respect to claims that can be supported by the present specification. Further, while in numerous cases herein wherein systems and apparatuses and methods are described as having a certain number of elements it will be understood that such systems, apparatuses and methods can be practiced with fewer than or more than the mentioned certain number of elements. Also, while a number of particular embodiments have been set forth, it will be understood that features and aspects that have been described with reference to each particular embodiment can be used with each remaining particularly set forth embodiment.

What is claimed is:

1. A method comprising:
    placing a robot at a position in front of a mining wall, the robot having a tool assembly that includes a camera system;
    obtaining one or more image representation using the camera system;
    positioning with the robot one or more charging component for entry into a drill hole, the positioning including using image data obtained with the camera system;
    moving with the robot the one or more charging component within the drill hole;
    feeding with the robot explosive material into the drill hole;
    picking up one or more component of the one or more charging component from a magazine; and
    with the magazine, autonomously assembling a primer to a detonator of a detonator package;
    wherein the obtaining includes performing a prescan of a wall and determining a scan path based on image data obtained during the prescan, and wherein the obtaining further includes scanning a wall and detecting drill holes represented in image data obtained during the scanning.

2. The method of claim 1, wherein the method includes registering detected drill holes detected using the one or more image representation in a drilling map.

3. The method of claim 1, wherein the one or more charging component includes a charging hose, wherein the robot holds the charging hose, wherein the method includes picking up a detonator package with the robot, wherein the picking up includes disposing the charging hose about a detonator package.

4. The method of claim 1, wherein the one or more charging component includes a charging hose, wherein the robot holds charging hose, wherein the method includes disposing the charging hose held by the robot about a detonator package so that the detonator package is held by the charging hose, wherein the method includes inserting the charging hose and the detonator package held by the charging hose into the drill hole.

5. The method of claim 1, wherein the one or more charging component includes a charging hose, wherein the robot holds the charging hose, wherein the method includes disposing the charging hose held by the robot about a detonator package so that the detonator package is held by the charging hose, wherein the method includes inserting the charging hose and the detonator package held by the charging hose into the drill hole, wherein the method includes feeding charging material through the charging hose into the drill hole while retracting the charging hose from the drill hole with the robot.

6. The method of claim 1, wherein the method includes detecting a plurality of drill holes, and determining whether all detected drill holes have been filled, and picking up a next detonator package if all detected drill holes have not been filled.

7. The method of claim 1, wherein the one or more charging component is selected from the group consisting of a charging hose, a detonator, a primer, a signal wire, and explosive material.

8. The method of claim 1, wherein the positioning comprises determining based on one or more image representation obtained with the camera system whether the tool assembly is properly positioned for entry into the drill hole and responsively to a determination that the tool assembly is not properly positioned positioning the tool assembly based on one or more operator input.

9. The method of claim 1, wherein the method includes detecting a drill hole representation of the drill hole in the one or more image representation, and registering the drill hole as a detected hole in a drilling map.

10. The method of claim 1, wherein the method includes providing a drilling map having information of a sequence of drill holes to charge and a detonator package associated to each drill holes of the sequence of drill holes, and wherein the method includes using the drilling map to select a proper detonator package for use in charging a current drill hole being subject to charging.

11. The method of claim 1, wherein the moving with the robot the one or more component within the drill hole includes moving the one or more component from an opening of the drill hole to a distal end of the drill hole in an automated operating mode, wherein movement of the one or more component is independent of any current operator input with the automated operating mode active.

12. The method of claim 1, wherein image data of the one or more image representation includes 3D point cloud image data.

13. A robot system comprising:
a robot including a robot arm, the robot arm having a plurality of links and a plurality of joints;
a tool assembly disposed at a distal end of the robot arm, wherein the tool assembly has a camera system for use in obtaining image data, and wherein the tool assembly is configured to hold one or more charging component; and
wherein the tool assembly is operative to perform one or more movement selected from (a) autonomously pushing the one or more charging component forwardly within a drill hole, (b) autonomously retracting the one or more charging component within a drill hole, and (c) autonomously rotating the one or more charging component within a drill hole;
wherein the robot is structured to (i) detect a plurality of drill holes, (ii) determine whether all detected drill holes have been filled, and (iii) pick up a next detonator package if all detected drill holes have not been filled.

14. The robot system of claim 13, wherein the tool assembly is operative to perform each of (a) pushing the one or more charging component forwardly, (b) retracting the one or more charging component, and (c) rotating the one or more charging component.

15. The robot system of claim 13, wherein the camera system is a 3D camera system for use in obtaining 3D point cloud image data.

16. The robot system of claim 13, wherein the one or more charging component includes a charging hose and wherein the robot is operative to feed explosive material through the charging hose while retracting the charging hose.

17. The robot system of claim 13, wherein the robot for performing the one or more movement provides motion to the one or more charging component that corresponds to motion currently being imparted to an actuator by an operator.

18. The robot system of claim 13, wherein the robot is configured to operate in an automated mode of operation in which the robot with the tool assembly automatically performs a charging component positioning procedure for controlling a positioning of one or more charging component, wherein the charging component positioning procedure is selected from the group consisting of (a) a procedure for moving the one or more charging component from an opening of a drill hole to the distal end of the drill hole, (b) a procedure for positioning the one or more charging component for drill hole entry, and (c) a procedure for positioning the one or more charging component to avoid an obstruction within a drill hole.

19. A method comprising:
connecting a tool assembly to a robot arm of a robot, the robot arm having a plurality of links and a plurality of joints;
obtaining image data from a camera attached to the robot arm;
holding one or more charging components with the tool assembly; and
moving the one or more charging components into a desired location; wherein the moving includes autonomously moving the one or more charging components in a first direction within a drilled hole, autonomously retracting the one or more charging components in a direction opposite of the first direction within the drilled hole, and/or rotating the one or more charging components within the drilled hole;
providing a drilling map having information of a sequence of drill holes to charge and a detonator package associated to each drill holes of the sequence of drill holes;

using the drilling map to select a proper detonator package for use in charging a current drill hole being subject to charging.

* * * * *